United States Patent
Okitsu

(10) Patent No.: US 8,517,554 B2
(45) Date of Patent: Aug. 27, 2013

(54) FRAME FOR LIGHT SOURCE DEVICE, LIGHT SOURCE DEVICE, AND DISPLAY DEVICE

(75) Inventor: Motoaki Okitsu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 265 days.

(21) Appl. No.: 13/140,433

(22) PCT Filed: Oct. 19, 2009

(86) PCT No.: PCT/JP2009/068006
§ 371 (c)(1),
(2), (4) Date: Jun. 17, 2011

(87) PCT Pub. No.: WO2010/073804
PCT Pub. Date: Jul. 1, 2010

(65) Prior Publication Data
US 2011/0249453 A1 Oct. 13, 2011

(30) Foreign Application Priority Data
Dec. 25, 2008 (JP) .................................. 2008-330141

(51) Int. Cl.
G09F 13/04 (2006.01)
G09F 13/08 (2006.01)

(52) U.S. Cl.
USPC ........................................ 362/97.1; 362/633

(58) Field of Classification Search
USPC ................................ 362/97.1, 97.2, 97.3, 633
See application file for complete search history.

(56) References Cited

U.S. PATENT DOCUMENTS

| | | | |
|---|---|---|---|
| 6,498,631 B2 * | 12/2002 | Natsuyama | ..................... 349/62 |
| 2005/0151894 A1 | 7/2005 | Katsuda et al. | |
| 2007/0229995 A1 | 10/2007 | Kawato et al. | |
| 2008/0130211 A1 | 6/2008 | Takuma | |
| 2008/0218954 A1 | 9/2008 | Kawano | |

FOREIGN PATENT DOCUMENTS

| | | |
|---|---|---|
| JP | 11-167110 A | 6/1999 |
| JP | 2002-109926 A | 4/2002 |
| JP | 2004-319164 A | 11/2004 |
| JP | 2009-175444 A | 8/2009 |
| WO | 2005/124401 A1 | 12/2005 |

OTHER PUBLICATIONS

Official Communication issued in corresponding Russian Patent Application No. 2011130823, mailed on Oct. 31, 2012.
Official Communication issued in corresponding European Patent Application No. 09834609.1, mailed on May 4, 2012.
Official Communication issued in International Patent Application No. PCT/JP2009/068006, mailed on Nov. 24, 2009.

* cited by examiner

Primary Examiner — Stephen F Husar
Assistant Examiner — James Cranson, Jr.
(74) Attorney, Agent, or Firm — Keating & Bennett, LLP

(57) ABSTRACT

A display device capable of preventing optical members and a display panel from getting in contact with each other and thus from getting a scratch while preventing luminosity at a border portion of the display panel from being lowered. A frame (1a) for a light source device included in the display device includes a front side section (12) having a substantially square shape that includes an opening and a white-colored inner peripheral surface (14a) around the opening, and a spacer section (13) disposed between a border portion of the display panel and a border portion of the optical members that is placed on a support face of a chassis, by the spacer section (13) the display panel and the optical members being kept apart from each other.

10 Claims, 16 Drawing Sheets

FRAME FOR LIGHT SOURCE DEVICE, LIGHT SOURCE DEVICE, AND DISPLAY DEVICE

TECHNICAL FIELD

The present invention relates to a frame for a light source device, a light source device, and a display device, and specifically relates to a frame for a light source device that is used in a display device including a non-self-emissive display panel such as a transmissive liquid crystal display panel, a light source device including the frame, and a display device including the light source device.

BACKGROUND ART

A display device that includes a non-self-emissive display panel such as a transmissive liquid crystal display panel generally includes a light source device that is disposed behind the display panel (also referred to as a "backlight device"). The light source device included in the display device is capable of illuminating the back side of the display panel with light. When the back side of the display panel is illuminated with the light emitted from the light source device, an image is displayed visible on the front side of the display panel.

Examples of the light source device that is used in the display device include a direct light source device and a side-edge light source device. Among them, a generally-used type of direct light source device includes a chassis having the shape of a tray of low height, a light source such as a fluorescent tube, optical members having a sheet or plate shape (also referred to as optical sheets) that are arranged to control the properties of light transmitted therethrough, and a frame having a substantially square shape with an opening. In the light source device, the light source is disposed in front of the chassis, and the optical members are disposed in front of the chassis and the light source. The frame is attached to the front side of the chassis so as to cover a border portion of the optical members while the light source and the optical members are disposed in front of the chassis. Thus, the border portion of the optical members is sandwiched between the front side of a border portion of the chassis and the back side of the frame, whereby the optical members are held in the light source device. The light source device having the configuration described above is arranged to control the properties of the light emitted from the light source with the use of the optical members, and to illuminate the back side of the display panel with the light the optical members transmit.

The display device including the light source device described above includes a bezel having a substantially square shape with an opening (i.e., a frame shape), and the display panel. In the display device, the display panel is disposed in front of the light source device (to be specific, a border portion of the display panel is disposed in front of the frame of the light source device). The bezel is attached to the front side of the display panel and the light source device so as to cover the border portion of the display panel and the front side and lateral sides of the frame of the light source device. In the display device having the configuration described above, the border portion of the display panel is sandwiched between the front side of the frame of the light source device and the back side of the bezel, whereby the display panel is held in the display device.

In the display device described above, the display panel is disposed in front of the optical members. If the display panel is disposed close to the optical members, there could arise problems as follows. When the optical members are shifted due to vibrations of the display device that is caused by an external force applied thereto, the optical members and the back side of the display panel could get in contact with and rub against each other, resulting in scratches on the optical members and a polarizing plate that is affixed on the display panel. The scratches made on the optical members and the polarizing plate could change the state of light the optical members and the polarizing plate transmit, which causes luminance unevenness to show up in an image displayed on the display panel.

In addition, if the optical members change in size (especially if the optical members increase in size) due to a change in temperature or humidity, a wrinkle could occur in the optical members. Due to the wrinkle in the optical members, intensity distribution in a plane direction of the light emitted from the light source device does not become even, which causes intensity unevenness in the emitted light. Because the display panel is disposed close to the optical members, the back side of the display panel is directly illuminated with the light with uneven intensity (the intensity unevenness of the light is not lessened nor removed), which could cause luminance unevenness to show up in an image displayed on the display panel.

Thus, if the display panel is disposed close to the optical members, the luminance unevenness showing up in the image displayed on the display panel could lower the display quality of the display device. In order to solve this problem, the distance between the front side of the optical members and the back side of the display panel may be increased. However, the increase of distance between the front side of the optical members and the back side of the display panel causes a problem as follows.

If the distance between the optical members and the display panel is increased, the border portion of the optical members and a cushioning material for holding the border portion of the optical members are seen through the clearance between the optical members and the display panel when the display panel of the display device is seen from the front side. The border portion of the optical members, which is placed on the front side of the border portion of the chassis, and of which the back side is accordingly not illuminated with the light the light source emits, is darker than the other portion of the optical members that is illuminated with the light. For the same reason, the cushioning material for holding the border portion of the optical members is darker than the other portion. Thus, the border portion of the display panel looks darker than the center portion of the display panel, which causes a luminance difference between the border portion and the center portion of the display panel to lower the display quality of the display device.

In order that the border portion of the optical members and the cushioning material for holding the border portion of the optical members may not be seen when the display panel is seen from the front side, the border portion of the optical members and the cushioning material are preferably disposed so as to coincide outside inner peripheral edges of the opening of the bezel. To be specific, a region of the optical members that is capable of transmitting the light emitted from the light source device is increased, and the outline of the region is disposed so as to coincide outside the inner peripheral edges of the opening of the bezel. Thus, when the display panel is seen from the front side, the border portion of the optical members and the cushioning material are hidden from view behind the bezel, and only the region of the optical members that is capable of transmitting the light emitted from the light source device can be seen. Consequently, the border portion of the display panel has no portion having a low luminosity, whereby the luminosity of the display panel can be made even all over the panel.

However, in the configuration described above, structural objects provided to the chassis that are used to place the border portion of the optical members thereon or to maintain the strength of the chassis need to be disposed so as to coincide outside the inner peripheral edges of the opening of the bezel. Thus, the overall size of the chassis needs to be increased while the size of the opening of the bezel is unchanged, which increases the size of a so-called frame region of the display device. This configuration of the display device cannot be easily applied to a display device prepared in attempt to have a narrower frame region. Meanwhile, if the region of the optical members that is capable of transmitting the light is increased while the overall size of the chassis is not increased, a region of the chassis where the structural objects to maintain the strength of the chassis are provided becomes narrow. Thus, the structural objects to maintain the strength of the chassis need to be decreased in size, which could weaken the strength of the chassis.

CITATION LIST

Patent Literature

PTL 1: WO2005/124401

SUMMARY OF INVENTION

Technical Problem

In order to overcome the problems described above, one preferred embodiment of the present invention provides a frame for a light source device that is capable of preventing a darker portion from generating in a border portion of a display panel while maintaining a distance between optical members and the display panel so as not to bring them into contact, a light source device including the frame, and a display device including the light source device. Another preferred embodiment of the present invention provides a frame for a light source device that allows a display device to have a narrower frame region while maintaining a distance between optical members and the display panel so as not to bring them into contact, a light source device including the frame, and a display device including the light source device. Another preferred embodiment of the present invention provides a frame for a light source device that is capable of preventing a darker portion from generating in a border portion of a display panel without weakening the strength of a chassis, a light source device including the frame, and a display device including the light source device.

Solution to Problem

Preferred embodiments of the present invention provide a frame for a light source device on which a display panel is to be placed that includes a front side section having a substantially square shape and including an opening, a surface on which the display panel is to be placed, and an inner peripheral surface that has a substantially white color and is disposed around the opening.

It is preferable that the inner peripheral surface of the front side section is a surface that is substantially perpendicular to the surface on which the display panel is to be placed, or a surface that is inclined such that the opening expands toward the surface on which the display panel is to be placed.

It is preferable that a material from which the frame is made is a resin having a substantially white color.

It is preferable that the inner peripheral surface of the front side section includes paint applied thereto, the paint having a substantially white color, or the inner peripheral surface of the front side section includes a reflection member affixed thereto that has a substantially white color and is arranged to reflect light.

In another aspect of the present invention, a frame for a light source device on which a display panel is to be placed includes a front side section having a substantially square shape and including an opening, a surface on which the display panel is to be placed and an inner peripheral surface around the opening, and a spacer section having a convex shape that includes lateral sides and is disposed along an inner peripheral edge of the front side section around the opening on a surface opposite to the surface on which the display panel is to be placed, wherein one of the lateral sides of the spacer section is the inner peripheral surface of the front side section, wherein the inner peripheral surface has a substantially white color.

Yet, in another aspect of the present invention, a frame for a light source device on which a display panel is to be placed includes a front side section having a substantially square shape and including an opening, a surface on which the display panel is to be placed and an inner peripheral surface around the opening, an inner wall that includes lateral sides, and a spacer section having a convex shape that is disposed outside the inner wall, the inner wall and the spacer section being disposed along an inner peripheral edge of the front side section around the opening on a surface opposite to the surface on which the display panel is to be placed, wherein one of the lateral sides of the inner wall is the inner peripheral surface of the front side section, wherein the inner peripheral surface has a substantially white color.

It is preferable that the inner peripheral surface of the front side section is a surface that is substantially perpendicular to the surface on which the display panel is to be placed, or a surface that is inclined such that the opening expands toward the surface on which the display panel is to be placed.

It is preferable that a material from which the frame is made is a resin having a substantially white color.

It is preferable that the inner peripheral surface of the front side section includes paint applied thereto, the paint having a substantially white color, or the inner peripheral surface of the front side section includes a reflection member affixed thereto that has a substantially white color and is arranged to reflect light.

Yet, in another aspect of the present invention, a light source device includes the frame described above, a light source, optical members having a plate shape and/or sheet shape that are arranged to control properties of light transmitted therethrough, and a chassis having a substantially flat plate shape that includes a support face on which a border portion of the optical members is placed, the light source being disposed in front of the chassis, the optical members being disposed in front of the chassis, the frame being attached to a front side of the chassis, wherein the border portion of the optical members is held between the support face of the chassis and the front side section of the frame while the inner peripheral surface of the front side section is disposed surrounding a region inside the border portion of the optical members that is placed on the support face of the chassis.

Yet, in another aspect of the present invention, a light source device includes the frame described above, a light source, optical members having a plate shape and/or sheet shape that are arranged to control properties of light transmitted therethrough, and a chassis having a substantially flat plate shape that includes a support face on which a border portion of the optical members is placed, the light source being disposed in front of the chassis, the optical members being disposed in front of the chassis, the frame being attached to a front side of the chassis, wherein the border portion of the optical members is held between the support face of the chassis and the spacer section of the front side section of the frame while the inner peripheral surface of the front side section is disposed surrounding a region inside the border portion of the optical members that is placed on the support face of the chassis.

Yet, in another aspect of the present invention, a display device includes the light source device described above, a display panel that is arranged to display an image and disposed on the surface of the front side section of the frame of the light source device on which the display panel is to be placed, and a bezel having a substantially square shape that includes an opening and is attached to a front side of the display panel and the frame, wherein the front side section of the frame is interposed between a border portion of the display panel and the border portion of the optical members that is placed on the support face of the chassis.

Yet, in another aspect of the present invention, a display device includes the light source device described above, a display panel that is arranged to display an image and disposed on the surface of the front side section of the frame of the light source device on which the display panel is to be placed, and a bezel having a substantially square shape that includes an opening and is attached to a front side of the display panel and the frame, wherein the spacer section of the frame is interposed between a border portion of the display panel and the border portion of the optical members that is placed on the support face of the chassis, whereby the display panel and the optical members are kept apart from each other by the spacer section of the frame.

Advantageous Effects of Invention

According to the preferred embodiments of the present invention, because the frame has the configuration that the light emitted from the light source device and transmitted through the optical members can be reflected also on the inner peripheral surface of the front side section of the frame, a darker portion can be prevented from generating in a border portion of an image displayed on the display panel including the frame having the configuration, whereby the image can be displayed with even luminosity all over the display panel. Therefore, the display quality of the display device can be improved.

Especially when the inner peripheral surface of the front side section is inclined such that the opening of the front side section expands toward the display panel, the light that is reflected on the inner peripheral surface is easily directed toward the display panel. Therefore, the luminosity at the border portion of the display panel can be more effectively prevented from being lowered.

According to the preferred embodiments of the present invention, because the frame has the configuration that the optical members and the display panel are kept apart from each other by the spacer section of the frame, the optical members and the display panel do not get in contact with each other and thus get no scratch on their surfaces. Therefore, luminance unevenness resulting from scratches on the surfaces of the optical members and the display panel can be prevented from showing up, which can improve the display quality of the display device.

In addition, because the frame has the configuration that the border portion of the optical members (i.e., the portion of the optical members that is placed on the support face of the chassis) is hidden from view by the inner peripheral surface of the frame, that is, the border portion of the optical members is hidden from view without being disposed so as to coincide far outside the inner peripheral surface of the frame, a frame region of the display device (i.e., the bezel) need not be increased in size and is prevented from being increased in size, so that an attempt to have a narrower frame region of the display device can be achieved. Therefore, such an attempt can be achieved while maintaining a distance between the optical members and the display panel so as not to bring them into contact.

In addition, because the frame has the configuration that the support face of the chassis is disposed close to the inner peripheral surface of the frame, the support face of the chassis need not be decreased in width and thus can have an enough width, preventing the strength of the chassis from being weakened. Therefore, without weakening the strength of the chassis, a darker portion can be prevented from generating in a border portion of an image displayed on the display panel.

As described above, according to the preferred embodiments of the present invention, while the optical members and the display panel are kept apart from each other and thus prevented from getting a scratch on their surfaces, a darker portion can be prevented from generating in the border portion of the display panel, which can improve the display quality of the display device.

DESCRIPTION OF EMBODIMENTS

A detailed description of preferred embodiments of the present invention will now be provided with reference to the accompanying drawings.

Figure 1:
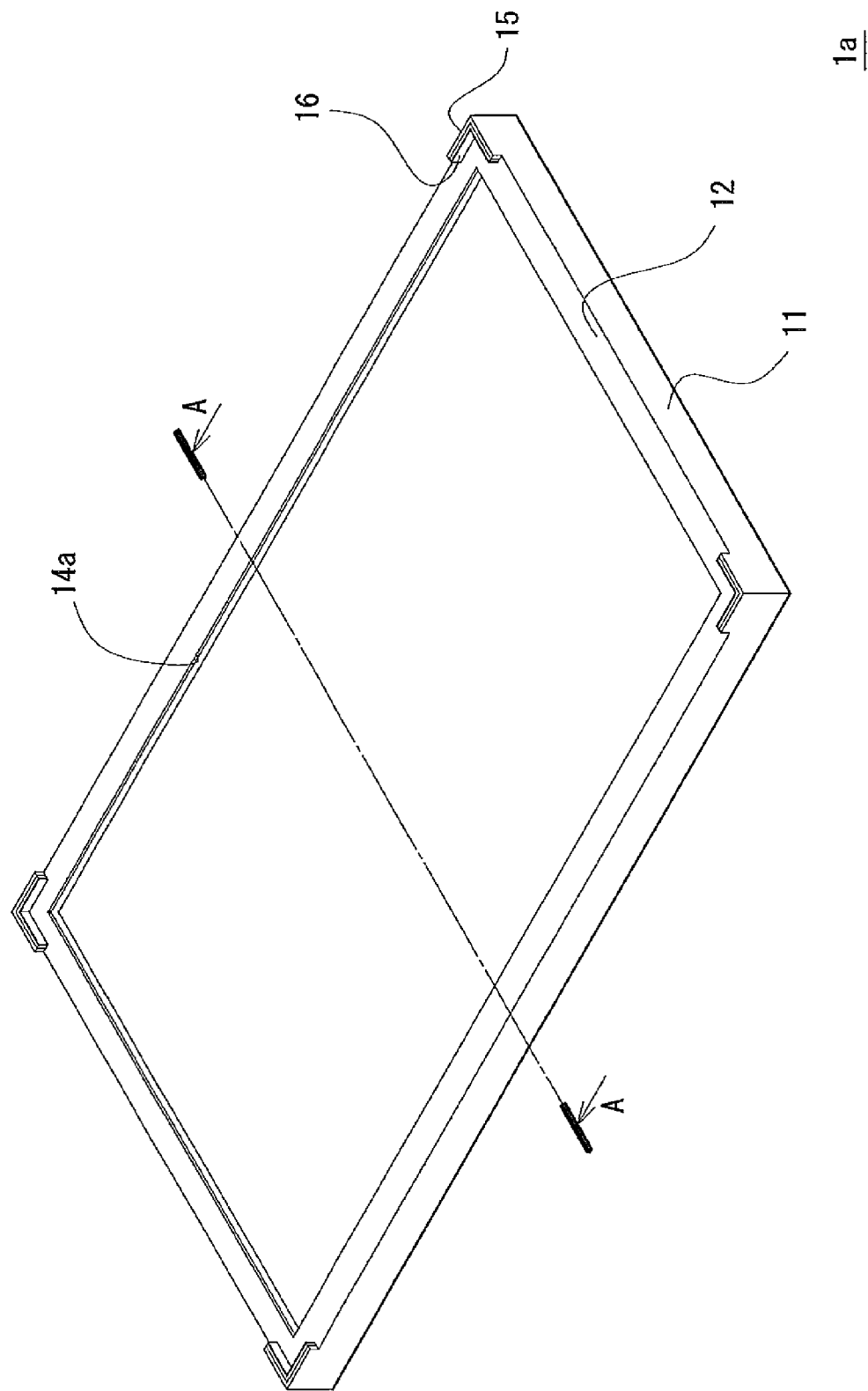
FIG. 1 is an external perspective view showing a schematic configuration of a frame according to a first preferred embodiment of the present invention.
Figure 2:
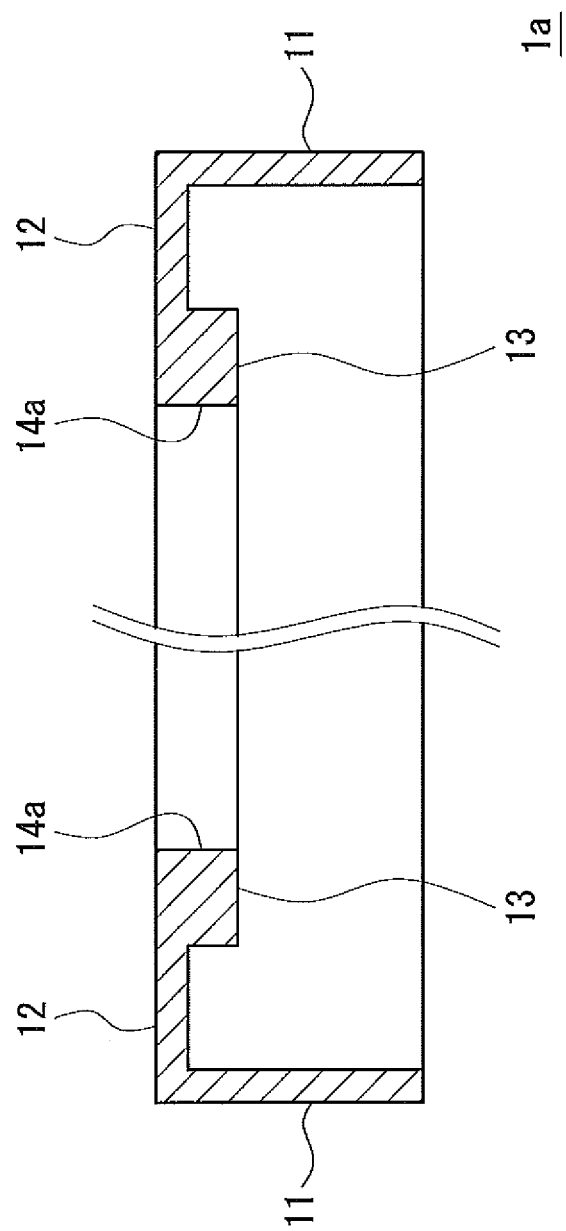
FIG. 2, which is a cross-sectional view showing the same along the line A-A of FIG. 1, is a schematic view showing a cross section structure of the frame according to the first preferred embodiment of the present invention.

FIG. 1 is an external perspective view showing a schematic configuration of a frame 1a for a light source device according to a first preferred embodiment of the present invention. FIG. 2, which is a cross-sectional view showing the same along the line A-A in the direction of the arrow of FIG. 1, is a schematic view showing a cross section structure of the frame 1a according to the first preferred embodiment of the present invention. In FIGS. 1 and 2, the front side of the frame 1a faces toward the tops of FIGS. 1 and 2, and the back side faces toward the bottoms of FIGS. 1 and 2.

As shown in FIG. 1, the frame 1a for the light source device according to the first preferred embodiment of the present invention has a substantially square shape with an opening. The frame 1a may be of a monolithic construction made of a resin material, may be of a multi-component assembled construction made of a resin material, may be of a monolithic construction made of a metal plate that is subjected to press working, or may be of a multi-component assembled construction made of a metal plate that is subjected to press working.

As shown in FIG. 1, the frame 1a includes a front side section 12 having the outside shape of a substantial open square. That is, the frame 1a includes an opening having a substantially square shape. The front side section 12 includes a planar surface on its front side, on which a border portion of a display panel is to be placed. The front side section 12 includes locating projections 15 for locating the display panel at predetermined positions. In FIG. 1, the locating projections 15 have the shape of the letter L and are disposed at the four corners of the front side section 12. Thus, the display panel can be placed on the frame 1a so as to be fit into a region surrounded by the locating projections 15. The locating projections 15 may each include cushioning materials 16 such as rubber and sponge on their inside surfaces. The front side section 12 includes also inner peripheral surfaces 14a that are substantially perpendicular to the planar surface on the front side of the front side section 12 at inner peripheral edges of all the sides of the front side section 12. (i.e., at the edges around the opening). In addition, the frame 1a includes outer walls 11 that rise toward the back side at outer peripheral edges of all the sides of the front side section 12.

As shown in FIG. 2, the frame 1a includes the outer walls 11 at the outer peripheral edges of all the sides of the front side section 12 of the frame 1a according to the first preferred embodiment of the present invention. Because the outer walls 11 define structures provided along the outer peripheral edges of all the sides of the front side section 12 so as to rise toward the back side, each side of the frame 1a has the shape of the letter L in cross section.

The front side section 12 includes spacer sections 13 on its back side, which allow a spacing of predetermined distance between optical members to be described later and the display panel. The spacer sections 13, which define structures having a convex shape and a given height that project toward the back side, are provided along inner peripheral edges around the opening on the back side of the front side section 12. The distance between the optical members and the display panel is determined by the height of the spacer sections 13. Hence, the height of the spacer sections 13 is set based on the distance between the optical members and the display panel (i.e., based on a distance of how far the optical members and the display panel should be kept apart). The spacer sections 13 are preferably provided continuously at the inner peripheral edges of all the sides of the front side section 12. To be specific, the spacer sections 13 are preferably provided around the opening without leaving a space.

One lateral sides of the spacer sections 13 (the lateral sides at the inner peripheral edges of the front side section 12) define the inner peripheral surfaces 14a of the front side section 12 of the frame 1a according to the first preferred embodiment of the present invention. The inner peripheral surfaces 14a define planar surfaces that are substantially perpendicular to the front side section 12. The inner peripheral surfaces 14a have a substantially white color. It is essential only that the inner peripheral surfaces 14a of the front side section 12 should have a substantially white color, and colors of the other portions of the frame 1a are not limited specifically. For example, the entire body of the frame 1a may have a substantially white color, or only the inner peripheral surfaces 14a of the front side section 12 may have a substantially white color (i.e., the other portions of the frame 1a have colors other than a substantially white color). It is essential only that at least the inner peripheral surfaces 14a of the front side section 12 should have a substantially white color in the frame 1a.

For example, the frame 1a may be made from a resin material having a substantially white color, or a resin material colored substantially white. Being made from such a resin material, the entire body of the frame 1a has a substantially white color, and accordingly the inner peripheral surfaces 14a of the front side section 12 have a substantially white color. When the frame 1a is made of a metal plate, at least the inner peripheral surfaces 14a of the front side section 12 can be applied with substantially white color paint. In this case, only the inner peripheral surfaces 14a of the front side section 12 may be applied with the substantially white color paint, or the entire body of the frame 1a may be applied with the substantially white color paint.

Shown in FIG. 2 are the spacer sections 13 that are filled; however, the spacer sections 13 are not limited to this configuration and may be hollow. It is essential only that the spacer sections 13 having the given height should be provided along the inner peripheral edges around the opening on the back side of the front side section 12, and the lateral sides of the spacer sections 13 that face the opening should be the inner peripheral surfaces 14a of the front side section 12. The spacer sections 13 and the front side section 12 may be of a monolithic construction, or a multi-component assembled construction.

Figure 3:
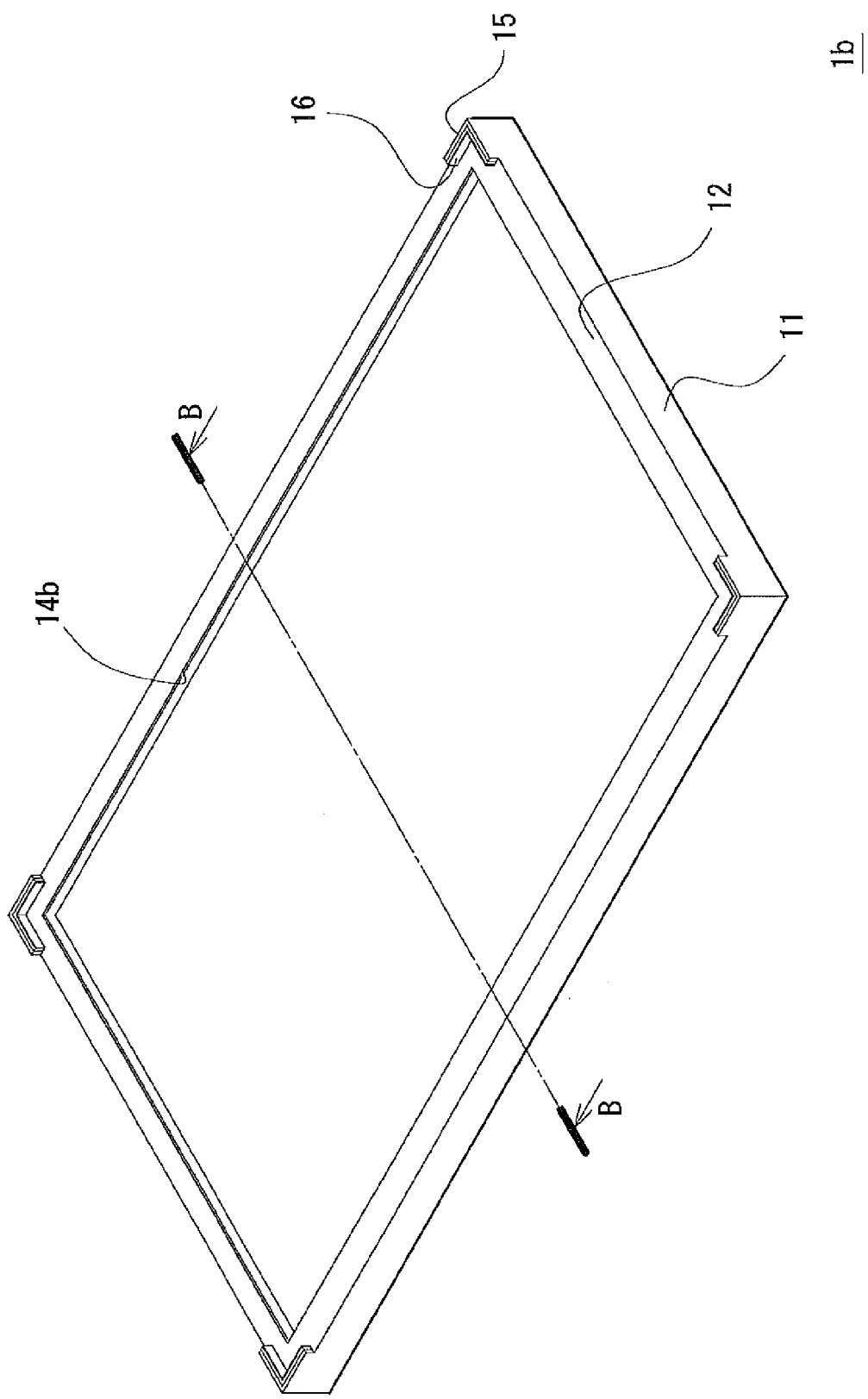
FIG. 3 is an external perspective view showing a schematic configuration of a frame according to a second preferred embodiment of the present invention.
Figure 4:
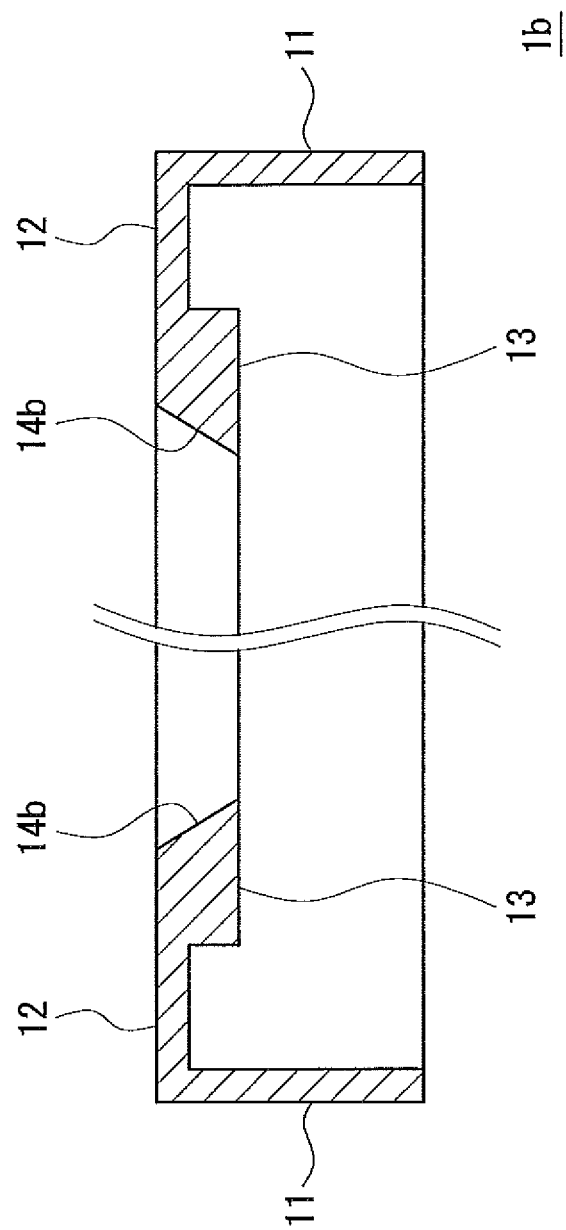
FIG. 4, which is a cross-sectional view showing the same along the line B-B of FIG. 3, is a schematic view showing a cross section structure of the frame according to the second preferred embodiment of the present invention.

Next, a description of a frame 1b for a light source device according to a second preferred embodiment of the present invention will be provided. FIG. 3 is an external perspective view showing a schematic configuration of the frame 1b according to the second preferred embodiment of the present invention. FIG. 4, which is a cross-sectional view showing the same along the line B-B in the direction of the arrow of FIG. 3, is a schematic view showing a cross section structure of the frame 1b according to the second preferred embodiment of the present invention.

As shown in FIG. 3, the frame 1b according to the second preferred embodiment of the present invention has a configuration similar to the configuration of the frame 1a according to the first preferred embodiment of the present invention. To be specific, the frame 1b according to the second preferred embodiment of the present invention has a substantially square shape with an opening. Similarly to the frame 1a according to the first preferred embodiment of the present invention, the frame 1b according to the second preferred embodiment of the present invention may be of a monolithic construction made of a resin material, may be of a multi-component assembled construction made of a resin material, may be of a monolithic construction made of a metal plate that is subjected to press working, or may be of a multi-component assembled construction made of a metal plate that is subjected to press working.

As shown in FIG. 3, the frame 1b includes the front side section 12 having the outside shape of the substantial open square. That is, the frame 1b includes the opening having the substantially square shape. The front side section 12 includes the planar surface on its front side, on which the border portion of the display panel is to be placed. The front side section 12 includes the locating projections 15 for locating the display panel at the predetermined positions. The locating projections 15 may each include the cushioning materials 16 such as rubber and sponge on their inside surfaces. The front side section 12 includes also inner peripheral surfaces 14b that are inclined at a given angle to the front side section 12 at the inner peripheral edges of all the sides of the front side section 12. (i.e., at the edges around the opening). In addition, the frame 1b includes the outer walls 11 that rise toward the back side at the outer peripheral edges of all the sides of the front side section 12.

As shown in FIG. 4, the frame 1b includes the outer walls 11 at the outer peripheral edges of all the sides of the front side section 12. Because the outer walls 11 define the structures provided along the outer peripheral edges of all the sides of the front side section 12 so as to rise toward the back side, each side of the frame 1b has the shape of the letter L in cross section.

The front side section 12 includes the spacer sections 13 on its back side, which allow a spacing of the predetermined distance between the optical members to be described later and the display panel. The spacer sections 13, which define the structures having the convex shape and the given height that project toward the back side, are provided along the inner peripheral edges around the opening on the back side of the front side section 12. The distance between the optical members and the display panel is determined by the height of the spacer sections 13. The spacer sections 13 are preferably provided continuously at the inner peripheral edges of all the sides of the front side section 12. To be specific, the spacer sections 13 are preferably provided around the opening without leaving a space.

The one lateral sides of the spacer sections 13 (the lateral sides at the inner peripheral edges of the front side section 12) define the inner peripheral surfaces 14b of the front side section 12 of the frame 1b according to the second preferred embodiment of the present invention. The inner peripheral surfaces 14b define planar surfaces that are inclined at the given angle to the front side section 12. To be specific, the inner peripheral surfaces 14b are inclined such that the opening expands from the back side toward the front side (i.e., toward the planar surface of the front side section 12 on which the display panel is to be placed). The inner peripheral surfaces 14b have a substantially white color.

It is essential only that the inner peripheral surfaces 14b of the front side section 12 should have a substantially white color, and colors of the other portions of the frame 1b are not limited specifically. For example, the entire body of the frame 1b may have a substantially white color, or only the inner peripheral surfaces 14b of the front side section 12 may have a substantially white color (i.e., the other portions of the frame 1b have colors other than a substantially white color). It is essential only that at least the inner peripheral surfaces 14b of the front side section 12 should have a substantially white color in the frame 1b. That is, concerning the color of the frame 1b according to the second preferred embodiment of the present, the same configuration as the frame 1a according to the first preferred embodiment of the present invention can be used.

Next, a description of a frame 1c for a light source device according to a third preferred embodiment of the present invention will be provided. The frame 1c according to the third preferred embodiment of the present invention has a configuration similar to the configuration of the frame 1a according to the first preferred embodiment of the present invention as a whole. Accordingly, explanations of configurations same as the frame 1a according to the first preferred embodiment of the present invention are omitted, and different respects are explained mainly.

Figure 5:
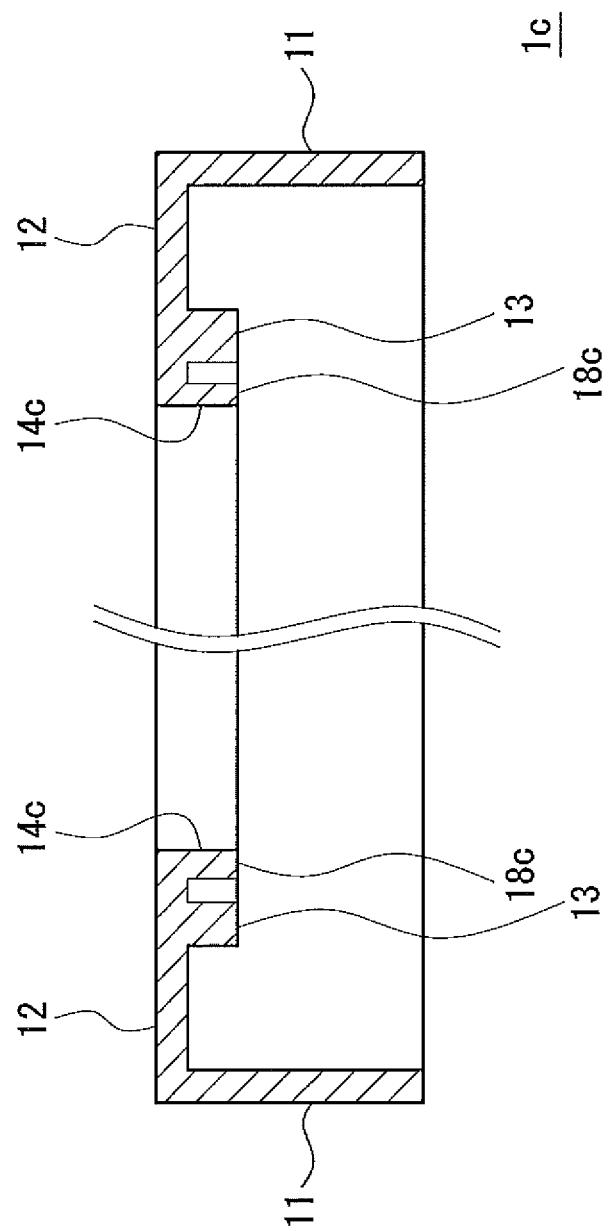
FIG. 5 is a schematic view showing a cross section structure of a frame for a light source device according to a third preferred embodiment of the present invention.

FIG. 5 is a schematic view showing a cross section structure of the frame 1c according to the third preferred embodiment of the present invention (corresponding to the cross section structure of the frame 1a shown along the line A-A in FIG. 1). As shown in FIG. 5, the frame 1c according to the third preferred embodiment of the present invention includes the front side section 12, and the outer walls 11 that rise toward the back side at the outer peripheral edges of all the sides of the front side section 12, and accordingly each side of the frame 1c has the shape of the letter L in cross section.

In addition, the frame 1c includes inner walls 18c along the inner peripheral edges around the opening on the back side of the front side section 12. The inner walls 18c are preferably provided continuously at the inner peripheral edges of all the sides of the front side section 12. One lateral sides of the inner walls 18c (the lateral sides at the inner peripheral edges of the front side section 12) define inner peripheral surfaces 14c of the front side section 12 of the frame 1c according to the third preferred embodiment of the present invention. The inner peripheral surfaces 14c define planar surfaces that are substantially perpendicular to the front side section 12. The configuration of the inner walls 18c is not limited specifically. It is essential only that the inner walls 18c should have a configuration such that the lateral sides that face the opening (i.e., the inner peripheral surfaces 14c) should be substantially perpendicular to the front side section 12. The height of the inner walls 18c is set to be almost the same as the height of the spacer sections 13 to be described later.

The spacer sections 13 are provided outside the inner walls 18c. The spacer sections 13 allow the spacing of predetermined distance between the optical members to be described later and the display panel. The spacer sections 13 define the structures having the convex shape and the given height. The distance between the optical members and the display panel is determined by the height of the spacer sections 13. Hence, the height of the spacer sections 13 is set based on the distance between the optical members and the display panel (i.e., based on the distance of how far the optical members and the display panel should be kept apart). The shape of the spacer sections 13 is not limited specifically, and it is essential only that the spacer sections 13 should have the given height. For example, it is preferable that the spacer sections 13 have the shape of a column, and the spacer sections 13 are aligned at given intervals outside the inner walls 18c, or it is preferable that the spacer sections 13 have the shape of a standing wall, and the spacer sections 13 are provided around the inner walls 18c.

The inner peripheral surfaces 14c of the front side section 12 of the frame 1c according to the third preferred embodiment of the present invention have a substantially white color. It is essential only that the inner peripheral surfaces 14c of the front side section 12 should have a substantially white color, and colors of the other portions of the frame 1c are not limited specifically. Concerning the color of the frame 1c according to the third preferred embodiment of the present, the same configuration as the frame 1a according to the first preferred embodiment of the present invention can be used.

Next, a description of a frame 1d for a light source device according to a fourth preferred embodiment of the present invention will be provided. The frame 1d according to the fourth preferred embodiment of the present invention has a configuration similar to the configuration of the frame 1c according to the third preferred embodiment of the present invention as a whole. Accordingly, explanations of configurations same as the frame 1c according to the third preferred embodiment of the present invention are omitted, and different respects are explained mainly.

Figure 6:
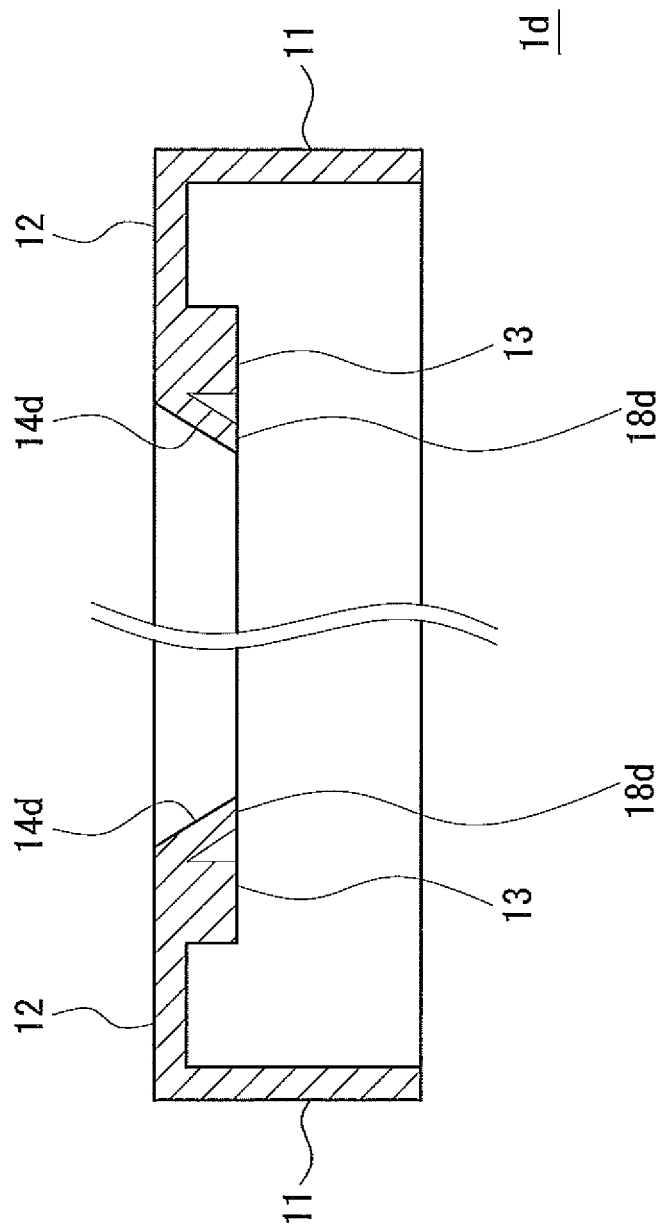
FIG. 6 is a schematic view showing a cross section structure of a frame for a light source device according to a fourth preferred embodiment of the present invention.

FIG. 6 is a schematic view showing across section structure of the frame 1d according to the fourth preferred embodiment of the present invention (corresponding to the cross section structure of the frame 1a shown along the line A-A in FIG. 1, or the cross section structure of the frame 1b shown along the line B-B in FIG. 3). As shown in FIG. 6, the frame 1d according to the fourth preferred embodiment of the present invention includes the front side section 12 and the outer walls 11, and accordingly each side of the frame 1d has the shape of the letter L in cross section. The frame 1d includes inner walls 18d along the inner peripheral edges around the opening on the back side of the front side section 12. The inner walls 18d define structures that project toward the back side. One lateral sides of the inner walls 18d (the lateral sides at the inner peripheral edges of the front side section 12) define inner peripheral surfaces 14d of the front side section 12 of the frame 1d according to the fourth preferred embodiment of the present invention. The inner walls 18d are preferably provided continuously at the inner peripheral edges of all the sides of the front side section 12. The inner peripheral surfaces 14d define planar surfaces that are inclined at a given angle to the front side section 12. To be specific, the inner peripheral surfaces 14d are inclined such that the opening expands from the back side toward the front side (i.e., toward the planar surface of the front side section 12 on which the border portion of the display panel is to be placed). The configuration of the inner walls 18d is not limited specifically. It is essential only that the inner walls 18d should have a configuration such that the lateral sides that face the opening (i.e., the inner peripheral surfaces 14d) should be the planar surfaces that are inclined at the given angle to the planar surface on the front side of the front side section 12. The angle of inclination is not limited specifically. The height of the inner walls 18d is set to be almost the same as the height of the spacer sections 13.

The spacer sections 13 are provided outside the inner walls 18d. Concerning the spacer sections 13, the same configuration as the spacer sections 13 of the frame 1c according to the third preferred embodiment of the present invention can be used.

The inner peripheral surfaces 14d of the front side section 12 of the frame 1d according to the fourth preferred embodiment of the present invention have a substantially white color. It is essential only that the inner peripheral surfaces 14d of the front side section 12 should have a substantially white color, and colors of the other portions of the frame 1d are not limited specifically. Concerning the color of the frame 1d according to the fourth preferred embodiment of the present, the same configuration as the frame 1a according to the first preferred embodiment of the present invention can be used.

Figure 7:
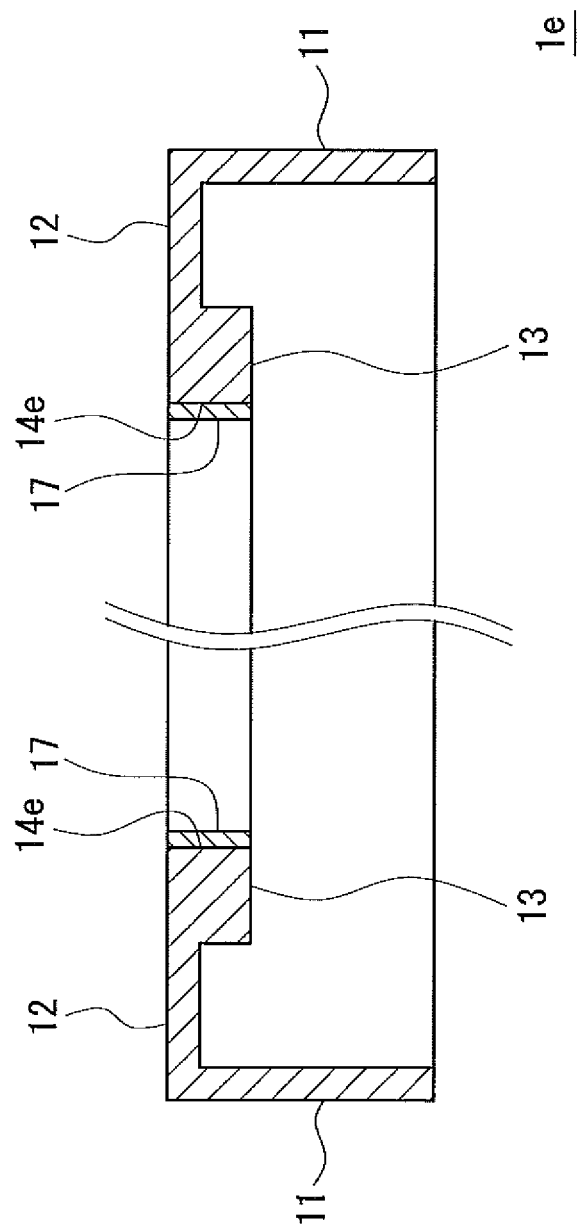
FIG. 7 is a schematic view showing a cross section structure of a frame for a light source device according to a fifth preferred embodiment of the present invention.

Next, a description of a frame 1e for a light source device according to a fifth preferred embodiment of the present invention will be provided. The frame 1e according to the fifth preferred embodiment of the present invention has a configuration similar to the configuration of the frame 1a according to the first preferred embodiment of the present invention as a whole. Accordingly, detailed explanation thereof is omitted. FIG. 7 is a schematic view showing a cross section structure of the frame 1e according to the fifth preferred embodiment of the present invention (corresponding to the cross section structure of the frame 1a shown along the line A-A in FIG. 1). As shown in FIG. 7, the frame 1e according to the fifth preferred embodiment of the present invention includes the front side section 12 and the outer walls 11, and accordingly each side of the frame 1e has the shape of the letter L in cross section. The frame 1e includes the spacer sections 13 along the inner peripheral edges around the opening on the back side of the front side section 12. The one lateral sides of the spacer sections 13 (the lateral sides at the inner peripheral edges of the front side section 12) define inner peripheral surfaces 14e of the front side section 12 of the frame 1e according to the fifth preferred embodiment of the present invention. The inner peripheral surfaces 14e define planar surfaces that are substantially perpendicular to the front side section 12.

The inner peripheral surfaces 14e of the front side section 12 of the frame 1e according to the fifth preferred embodiment of the present invention each include reflection members 17 (e.g., reflection tapes, reflection films and reflection sheets) affixed thereto. The reflection members 17 have a substantially white color and a surface property of diffusely reflecting light. A variety of conventional reflection members can be used for the reflection members 17.

The color of the frame 1e according to the fifth preferred embodiment of the present invention is not limited specifically.

Figure 8:
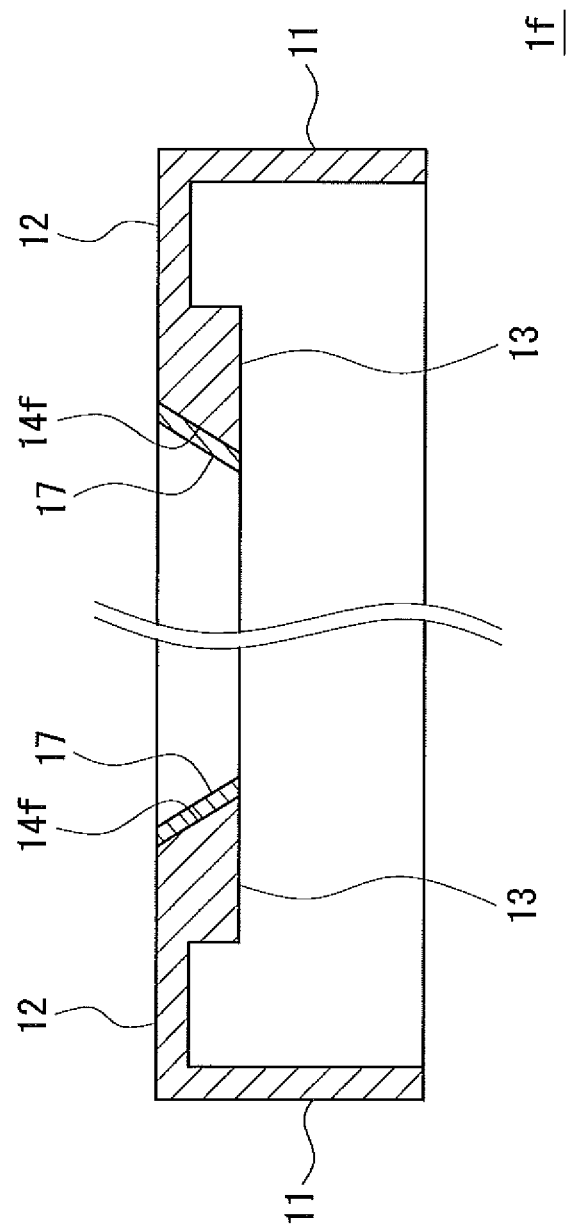
FIG. 8 is a schematic view showing a cross section structure of a frame for a light source device according to a sixth preferred embodiment of the present invention.

Next, a description of a frame 1f for a light source device according to a sixth preferred embodiment of the present invention will be provided. The frame 1f according to the sixth preferred embodiment of the present invention has a configuration similar to the configuration of the frame 1b according to the second preferred embodiment of the present invention as a whole. Accordingly, detailed explanation thereof is omitted. FIG. 8 is a schematic view showing a cross-section structure of the frame 1f according to the sixth preferred embodiment of the present invention (corresponding to the cross section structure of the frame 1b shown along the line B-B in FIG. 3). As shown in FIG. 8, the frame 1f according to the sixth preferred embodiment of the present invention includes the front side section 12 and the outer walls 11, and accordingly each side of the frame 1f has the shape of the letter L in cross section. The frame 1f includes the spacer sections 13 along the inner peripheral edges around the opening on the back side of the front side section 12. The one lateral sides of the spacer sections 13 (the lateral sides that face the opening) define inner peripheral surfaces 14f of the front side section 12 of the frame 1f according to the sixth preferred embodiment of the present invention. The inner peripheral surfaces 14f are inclined such that the opening expands from the back side toward the front side (i.e., toward the planar surface of the front side sections 12 on which the border portion of the display panel is to be placed).

The inner peripheral surfaces 14f of the front side section 12 of the frame 1f according to the sixth preferred embodiment of the present invention each include the reflection members 17 (e.g., reflection tapes, reflection films and reflection sheets) affixed thereto. The reflection members 17 have a substantially white color and a surface property of diffusely reflecting light. A variety of conventional reflection members can be used for the reflection members 17.

The color of the frame 1f according to the sixth preferred embodiment of the present invention is not limited specifically.

Figure 9:
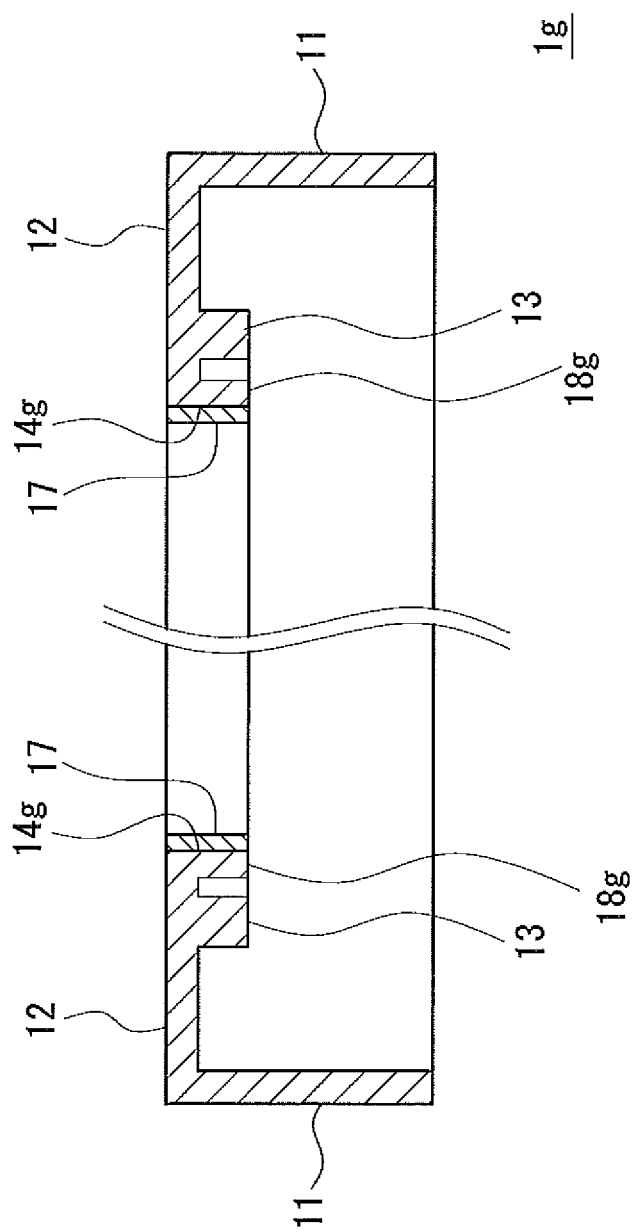
FIG. 9 is a schematic view showing across section structure of a frame for a light source device according to a seventh preferred embodiment of the present invention.

Next, a description of a frame 1g for a light source device according to a seventh preferred embodiment of the present invention will be provided. The frame 1g according to the seventh preferred embodiment of the present invention has a configuration similar to the configuration of the frame 1c according to the third preferred embodiment of the present invention as a whole. Accordingly, detailed explanation thereof is omitted. FIG. 9 is a schematic view showing a cross-section structure of the frame 1g according to the seventh preferred embodiment of the present invention (corresponding to the cross section structure of the frame 1a shown along the line A-A in FIG. 1, or the cross section structure of the frame 1b shown along the line B-B in FIG. 3). As shown in FIG. 9, the frame 1g according to the seventh preferred embodiment of the present invention includes the front side section 12 and the outer walls 11, and accordingly each side of the frame 1g has the shape of the letter L in cross section. The frame 1g includes inner walls 18g along the inner peripheral edges around the opening on the back side of the front side section 12. The spacer sections 13 are provided outside the inner walls 18g. Concerning the spacer sections 13, the same configuration as the spacer sections 13 of the frame 1c according to the third preferred embodiment of the present invention can be used. One lateral sides of the inner walls 18g (the lateral sides at the inner peripheral edges of the front side section 12) define inner peripheral surfaces 14g of the front side section 12 of the frame 1g according to the seventh preferred embodiment of the present invention. The inner peripheral surfaces 14g define planar surfaces that are substantially perpendicular to the front side section 12.

The inner peripheral surfaces 14g of the front side section 12 of the frame 1g according to the seventh preferred embodiment of the present invention each include the reflection members 17 (e.g., reflection tapes, reflection films and reflection sheets) affixed thereto. The reflection members 17 have a substantially white color and a surface property of diffusely reflecting light. A variety of conventional reflection members can be used for the reflection members 17.

The color of the frame 1g according to the seventh preferred embodiment of the present invention is not limited specifically.

Figure 10:
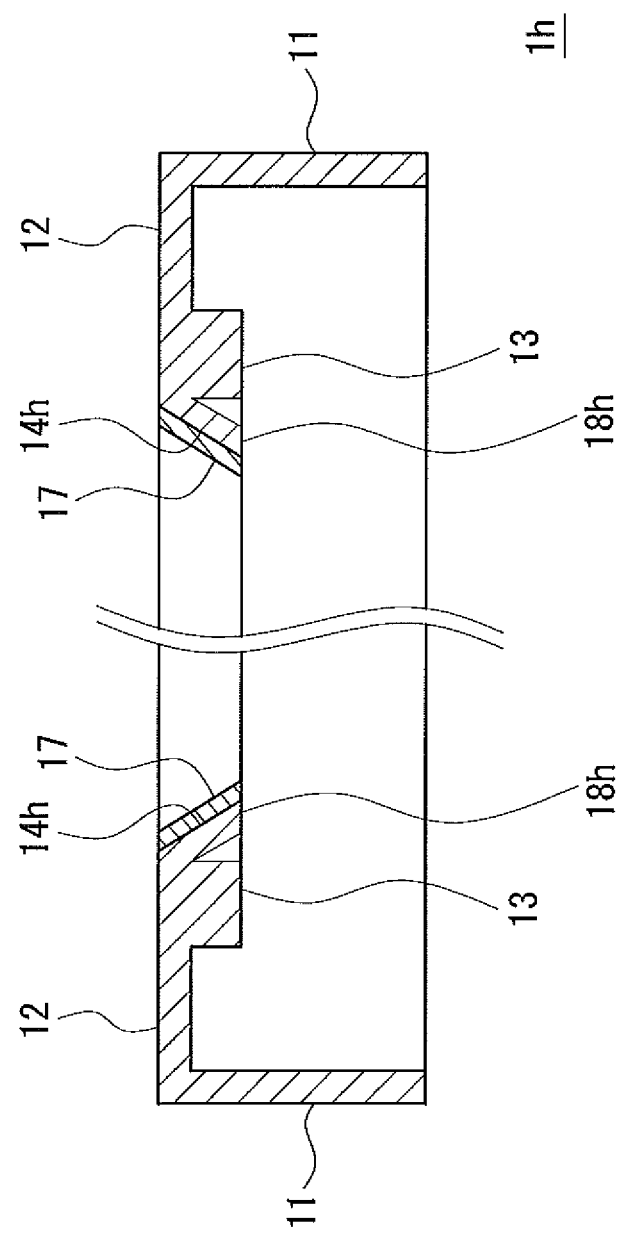
FIG. 10 is a schematic view showing across section structure of a frame for a light source device according to an eighth preferred embodiment of the present invention.

Next, a description of a frame 1h for a light source device according to an eighth preferred embodiment of the present invention will be provided. The frame 1h according to the eighth preferred embodiment of the present invention has a configuration similar to the configuration of the frame 1d according to the fourth preferred embodiment of the present invention as a whole. Accordingly, detailed explanation thereof is omitted. FIG. 10 is a schematic view showing a cross section structure of the frame 1h according to the eighth preferred embodiment of the present invention (corresponding to the cross section structure of the frame 1a shown along the line A-A in FIG. 1). As shown in FIG. 10, the frame 1h according to the eighth preferred embodiment of the present invention includes the front side section 12 and the outer walls 11, and accordingly each side of the frame 1h has the shape of the letter L in cross section. The frame 1h includes inner walls 18h along the inner peripheral edges around the opening on the back side of the front side section 12. The spacer sections 13 are provided outside the inner walls 18h. Concerning the spacer sections 13, the same configuration as the spacer sections 13 of the frame 1c according to the third preferred embodiment of the present invention can be used. One lateral sides of the inner walls 18h (the lateral sides that face the opening) define inner peripheral surfaces 14h of the front side section 12 of the frame 1h according to the eighth preferred embodiment of the present invention. The inner peripheral surfaces 14h are inclined such that the opening expands from the backside toward the front side.

The inner peripheral surfaces 14h of the front side section 12 of the frame 1h according to the eighth preferred embodiment of the present invention each include the reflection members 17 (e.g., reflection tapes, reflection films and reflection sheets) affixed thereto. The reflection members 17 have a substantially white color and a surface property of diffusely reflecting light. A variety of conventional reflection members can be used for the reflection members 17.

The color of the frame 1h according to the eighth preferred embodiment of the present invention is not limited specifically.

Next, descriptions of a light source device including any one of the frames 1a, 1b, 1c, 1d, 1e, 1f, 1g and 1h according to the first to eighth preferred embodiments of the present invention (hereinafter, referred to as a light source device according to a preferred embodiment of the present invention) will be provided.

Figure 11:
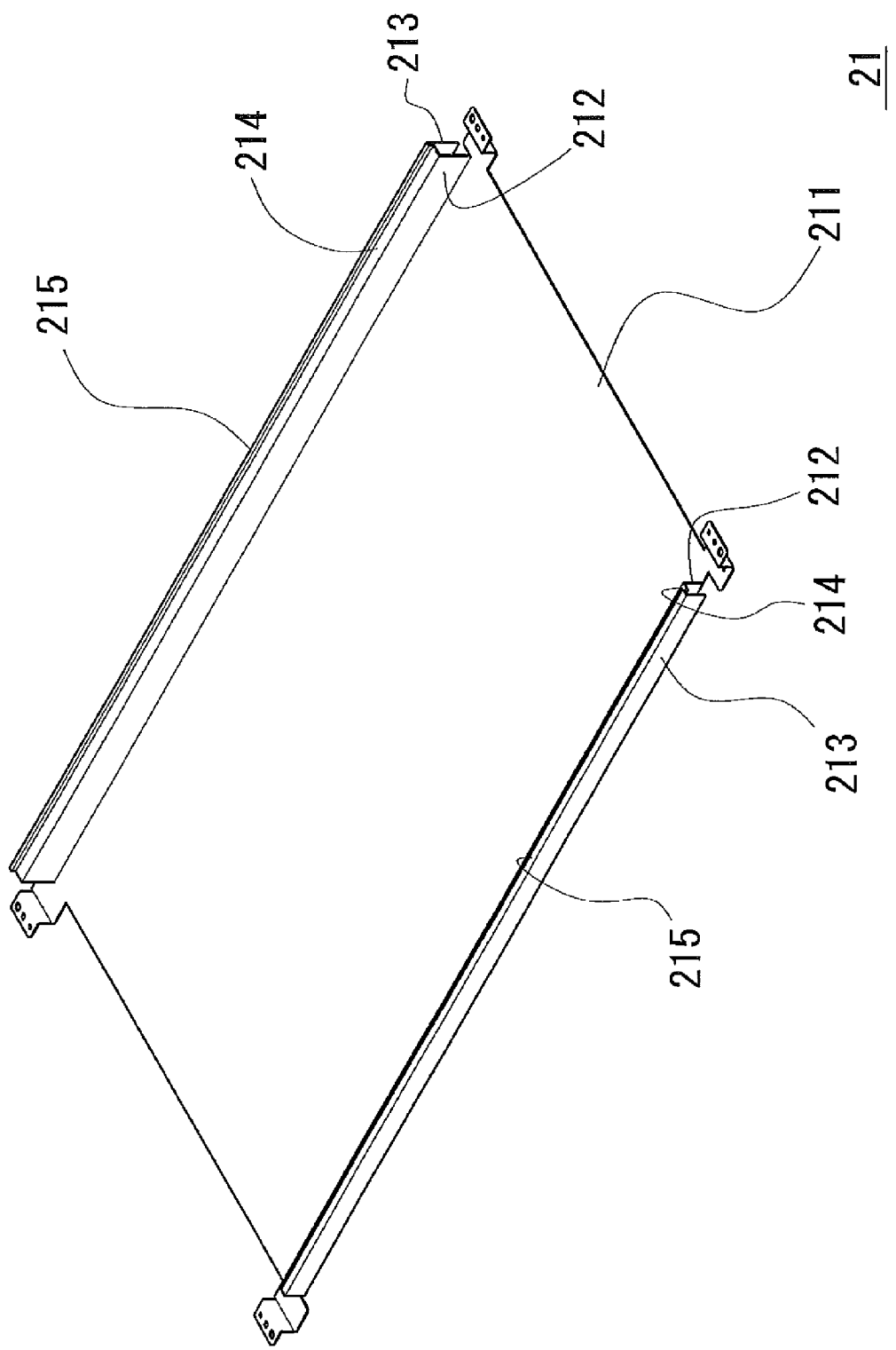
FIG. 11 is an external perspective view showing a schematic configuration of a chassis preferably used for a display device including the frame according to any one of the preferred embodiments of the present invention.

FIG. 11 is an external perspective view showing a schematic configuration of a chassis 21 preferably used in the light source device according to the preferred embodiment of the present invention. In FIG. 11, the front side of the chassis 21 faces toward the top of FIG. 11, and the back side faces toward the bottom of FIG. 11. The chassis 21 has the shape of a substantially square tray of low height. The chassis 21 includes a bottom 211, inner walls 212, support faces 214, top end faces 215, and outer walls 213. The bottom 211 has a substantially planar surface. The bottom 211 may include through-holes in which light source holders are to be engaged, which are omitted and not shown in FIG. 11. The inner walls 212 are each provided along the longer sides of the bottom 211 and raised from the bottom 211 toward the front side. The support faces 214 and the top end faces 215, which have planar surfaces, are provided at top ends of the inner walls 212 (at end portions of the inner walls 212 on the front side) to be substantially parallel to the bottom 211. The outer walls 213 are provided raised from the outer sides of the top end faces 215 toward the back side.

The chassis 21 is preferably made of a metal plate subjected to press working. The inner walls 212, the outer walls 213, the support faces 214 and the top end faces 215 maintain the strength of the chassis 21. For example, increasing the widths of the support faces 214 and the top end faces 215 improves the strength of the chassis 21, and decreasing the widths reduces the strength.

Figure 12:
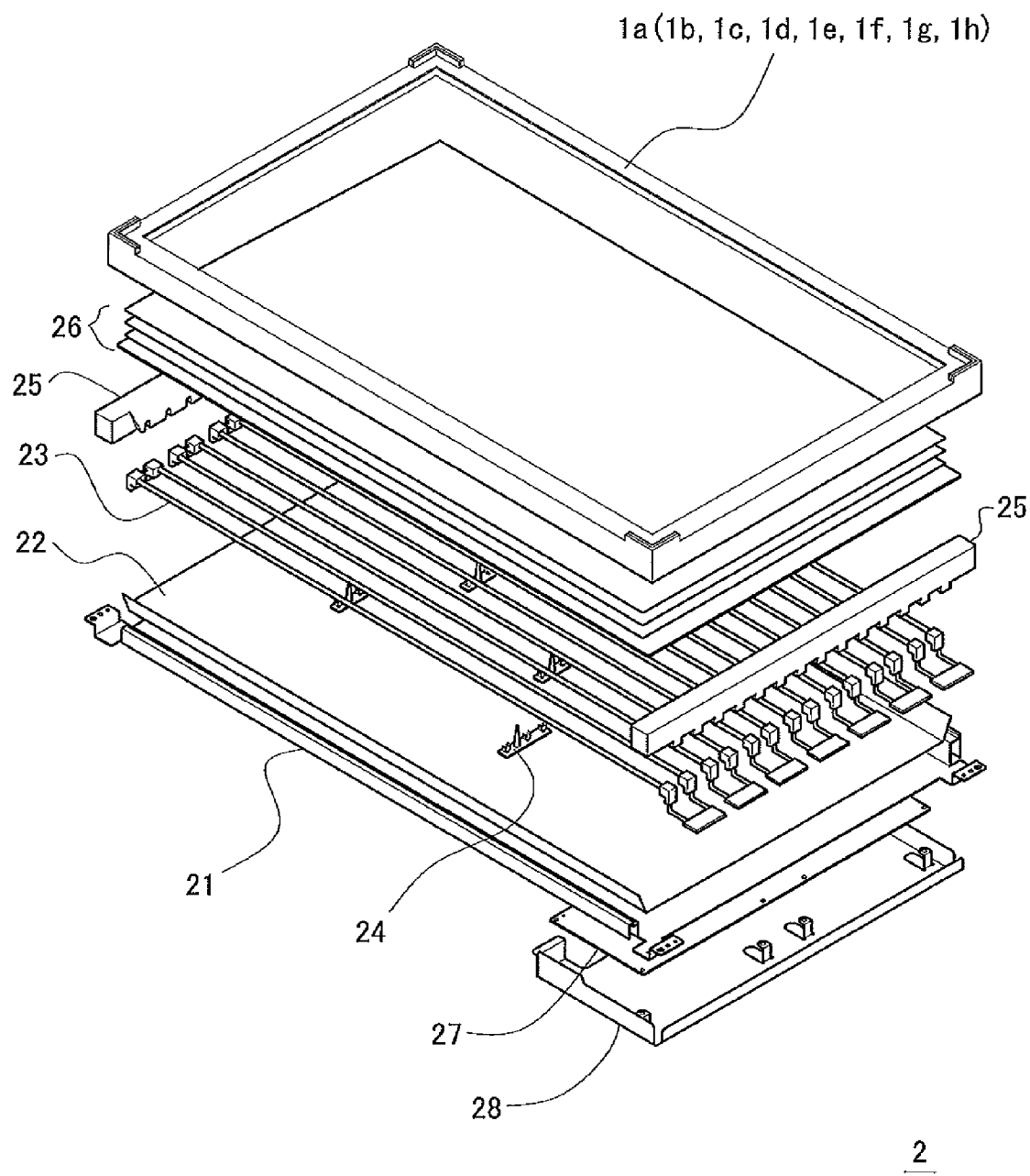
FIG. 12 is an exploded perspective view showing a schematic configuration of a light source device including the frame according to any one of the preferred embodiments of the present invention.
Figure 13:
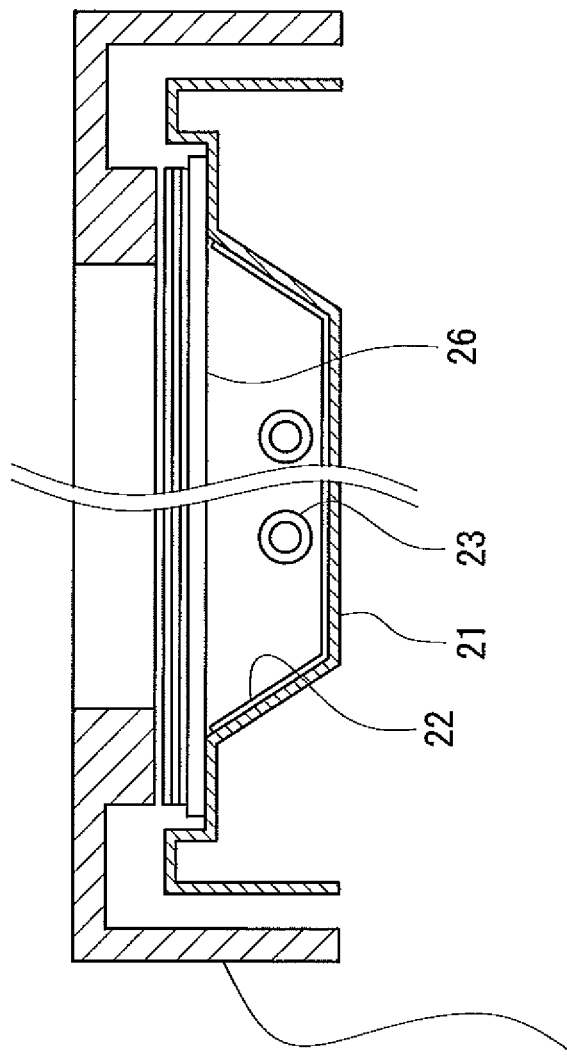
FIG. 13 is a schematic view showing a cross section structure of the light source device including the frame according to any one of the preferred embodiments of the present invention.

FIG. 12 is an exploded perspective view showing a schematic configuration of a light source device 2 according to a preferred embodiment of the present invention. FIG. 13 is a schematic view showing a cross section structure of the light source device 2 according to the preferred embodiment of the present invention. In FIGS. 12 and 13, the front side of the light source device 2 faces toward the tops of FIGS. 12 and 13, and the back side faces toward the bottoms of FIGS. 12 and 13.

The light source device 2 according to the preferred embodiment of the present invention includes the chassis 21, a reflection sheet 22, light sources 23, lamp holders 24, side holders 25, predetermined kinds of optical members (also referred to as optical sheets) 26, any one of the frames 1a, 1b, 1c, 1d, 1e, 1f, 1g and 1h according to the preferred embodiments of the present invention, a light source driving circuit board 27, and a light source driving circuit board cover 28. Shown in FIG. 12 is the light source device 2 including the frame 1a according to the first preferred embodiment of the present invention.

The light sources 23 are capable of emitting light with a given wavelength (e.g., white light). A variety of conventional light sources can be used for the light sources 23. Examples of the conventional light sources include a fluorescent tube such as a cold cathode fluorescent tube and a hot cathode fluorescent tube, a discharge lamp such as a xenon lamp, and a light emitting element such as an LED (Light Emitting Diode). The light source device 2 shown in FIG. 12 includes linear fluorescent tubes as the light sources 23; however, the present invention is not limited to this configuration.

The reflection sheet 22 has a sheet, film or plate shape, and has a surface property of diffusely reflecting light. The reflection sheet 22 is preferably expanded PET (polyethylene terephthalate) having a sheet, film or plate shape.

The lamp holders 24 are arranged to hold the light sources 23 to fix to the chassis 21 while supporting the optical members 26. Each lamp holder 24 includes clips for holding the light sources 23, a supporting pin for supporting the optical members 26, and an anchor for engaging the lamp holder 24 with the chassis 21. The clips, the supporting pin and the anchor of each lamp holder 24 are of a monolithic construction preferably made of a resin material. Conventional lamp holders can be used for the lamp holders 24.

The optical members 26 are arranged to control the properties of light transmitted therethrough. Examples of the optical members 26 used in the light source device 2 include a diffusion plate, a diffusion sheet, a lens sheet, and a reflective polarizing sheet.

The diffusion plate is an optical member having the function of randomly diffusing light transmitted therethrough, allowing uniformalization of brightness distribution in a plane direction of the light. The diffusion plate is made from a nearly clear resin material that is a base material, in which fine particles having a property of reflecting light, or fine particles made of a material having a refractive index different from the base material are mixed. The diffusion plate has a thin plate shape by being subjected to injection molding.

The diffusion sheet is an optical member that has the same function as the diffusion plate. The diffusion sheet is made from a nearly clear material that is a base material, in which fine particles having a property of reflecting light, or fine particles made of a material having a refractive index different from the base material are mixed, and is formed into a sheet or film shape. The nearly clear base material is preferably PET (polyethylene terephthalate).

The lens sheet is an optical member having the function of gathering light transmitted therethrough, allowing enhancement of brightness of the light. The lens sheet has a layer structure made up of a base layer, and a layer of a given cross-sectional shape that has a light-gathering function. The base layer is preferably made from PET (polyethylene terephthalate). The layer having the light-gathering function is preferably made from an acrylic resin.

The reflective polarizing sheet (also referred to as a brightness enhancement sheet) is an optical member having the function of effectively using light. The reflective polarizing sheet is arranged to transmit light that is polarized in a given direction (i.e., light that vibrates in a given direction), and reflect light other than the polarized light. The reflective polarizing sheet is preferably a DBEF film (DBEF is a registered trademark of 3M COMPANY).

The light source driving circuit board 27 incorporates electronic circuits and/or electric circuits for driving the light sources 23. When fluorescent tubes are used for the light sources 23, the light source driving circuit board 27 incorporates inverter circuits. The light source driving circuit board cover 28 has the shape of a plate, or a tray of low height. The light source driving circuit board cover 28 is arranged to protect the light source driving circuit board 27, and prevent unnecessary radiation from the light source driving circuit board 27. For this purpose, the light source driving circuit board cover 28 is made from a conductor such as metal.

Next, a description of assembly of the light source device 2 including these components will be provided.

The reflection sheet 22 is laid on the front side of the bottom 211 of the chassis 21. The light sources 23 are arranged in parallel on the front side of the bottom 211 of the chassis 21 on which the reflection sheet 22 is laid. The light sources 23 are held by the lamp holders 24 and fixed to the front side of the bottom 211 of the chassis 21.

The side holders 25 are disposed along the shorter sides of the chassis 21 so as to cover both end portions of the light sources 23.

The optical members 26 are layered in a given order in front of the chassis 21 and the side holders 25. To be specific, the border portion of the optical members 26 is placed on the support faces 214 of the chassis 21 and the front sides of the side holders 25. The center portion of the optical members 26 is supported by the supporting pins of the light source holders 24.

Specific combinations of the optical member 26 include (1) a combination of a diffusion plate, a diffusion sheet, a lens sheet and a reflective polarizing sheet, where the diffusion plate, the diffusion sheet, the lens sheet and the reflective polarizing sheet are layered in this order from the back side of the light source device 2, (2) a combination of a diffusion plate, a reflective polarizing sheet and two diffusion sheets, where the diffusion plate, the two diffusion sheets and the reflective polarizing sheet are layered in this order from the back side of the light source device 2, (3) a combination of a diffusion plate, a lens sheet and two diffusion sheets, where the diffusion plate, the first diffusion sheet, the lens sheet and the second diffusion sheet are layered in this order from the back side of the light source device 2, and (4) a combination of a diffusion plate, and one, two or three diffusion sheets, where the diffusion plate, the predetermined number of diffusion sheets (one, two or three) are layered in this order from the back side of the light source device 2.

The combination and the kind of the optical members 26 are not limited to the ones described above. The combination and the kind of the optical members 26 are preferably determined according to the kind of the light source device 2 and the kind of the display device including the light source device 2.

Then, any one of the frames 1a, 1b, 1c, 1d, 1e, 1f, 1g and 1h according to the preferred embodiments of the present invention is attached to the front side of the chassis 21, whereby the border portion of the optical members 26 is sandwiched between the support faces 214 of the chassis 21 and the front side section 12 (i.e., the spacer sections 13 provided to the front side section 12) of the any one of the frames 1a, 1b, 1c, 1d, 1e, 1f, 1g and 1h, and between the front sides of the side holders 25 and the front side section 12 (i.e., the spacer sections 13 provided to the front side section 12) of the any one of the frames 1a, 1b, 1c, 1d, 1e, 1f, 1g and 1h (see especially FIG. 13). Thus, the optical members 26 are held in the light source device 2 according to the preferred embodiment of the present invention.

As shown in FIG. 13, the inner peripheral surfaces 14a, 14b, 14c, 14d, 14e, 14f, 14g or 14h of the front side section 12 of the any one of the frames 1a, 1b, 1c, 1d, 1e, 1f, 1g and 1h are disposed so as to almost coincide with or slightly inside inner peripheral edges of the support faces 214 of the chassis 21 and inner peripheral edges of the front sides of the side holders 25. To be specific, the inner peripheral surfaces 14a, 14b, 14c, 14d, 14e, 14f, 14g or 14h of the front side section 12 of the any one of the frames 1a, 1b, 1c, 1d, 1e, 1f, 1g and 1h are disposed so as to almost coincide with or slightly inside the outline of a region of the optical members 26, the region being capable of transmitting light emitted from the light sources 23. The front side section 12 of the frames 1a, 1b, 1c, 1d, 1e, 1f, 1g and 1h, and the support faces 214 of the chassis 21 are formed so as to satisfy the positional relation described above.

The light source driving circuit board 27 is disposed behind the chassis 21. The light source driving circuit board cover 28 is disposed so as to cover the light source driving circuit board 27. In FIG. 13, the light source driving circuit board 27 and the light source driving circuit board cover 28 are omitted and not shown.

With the configuration described above, the light emitted from the light sources 23 is transmitted through the optical members 26 and is projected toward the front side. However, because the border portion of the optical members 26 (i.e., the portion placed on the support faces 214 of the chassis 21 and the front sides of the side holders 25) is not illuminated from the behind, the light is not projected toward the front side through the border portion. Because the border portion of the optical members 26 is covered with the front side section 12 of the frame 1a, 1b, 1c, 1d, 1e, 1f, 1g or 1h, the region of the optical members 26 that is inside the border portion of the optical members 26 that is placed on the support faces 214 of the chassis 21 and the front sides of the side holders 25 (i.e., the region of the optical members 26 that is capable of transmitting light emitted from the light sources 23) is surrounded by the inner peripheral surfaces 14a, 14b, 14c, 14d, 14e, 14f, 14g or 14h of the front side section 12.

Thus, the light source device 2 according to the preferred embodiment of the present invention is capable of emitting light of which intensity distribution in a plane direction is almost even because the light passes through the opening of the frame 1a, 1b, 1c, 1d, 1e, 1f, 1g or 1h (i.e., the region surrounded by the inner peripheral surfaces 14a, 14b, 14c, 14d, 14e, 14f, 14g or 14h). This is because the border portion of the optical members 26 (i.e., the portion placed on the support faces 214 of the chassis 21 and the front sides of the side holders 25) is covered with the front side section 12 of the frame 1a, 1b, 1c, 1d, 1e, 1f, 1g or 1h, and the inner peripheral surfaces 14a, 14b, 14c, 14d, 14e, 14f, 14g or 14h of the front side section 12 have the substantially white color, or the reflection members 17 affixed to the inner peripheral surfaces 14a, 14b, 14c, 14d, 14e, 14f, 14g or 14h have the substantially white color, which allows excellent reflection of the light. Consequently, the intensity of the emitted light is not reduced in the vicinities of the inner peripheral surfaces 14a, 14b, 14c, 14d, 14e, 14f, 14g or 14h of the front side section 12 of the frame 1a, 1b, 1c, 1d, 1e, 1f, 1g or 1h.

Figure 14:
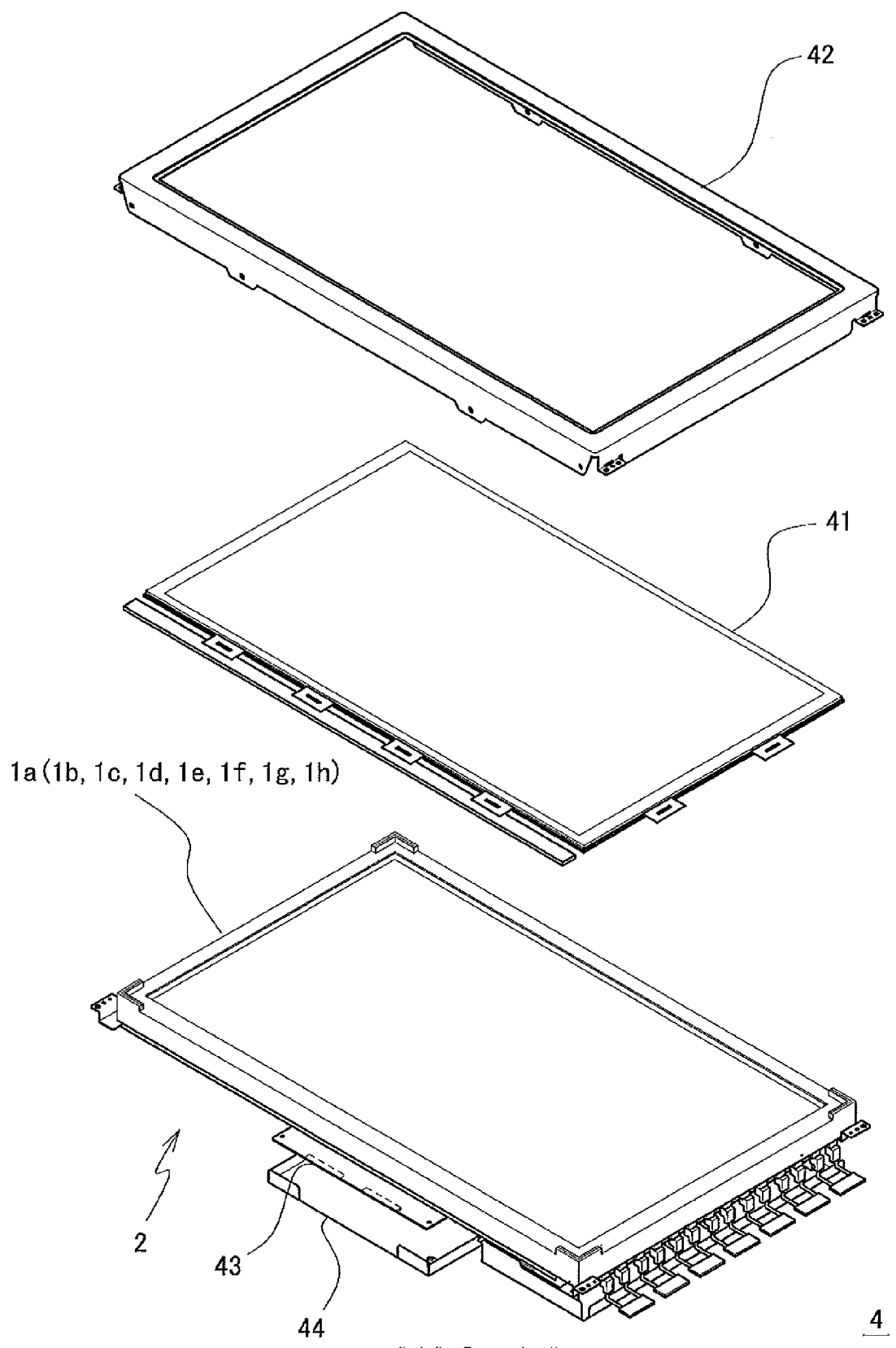
FIG. 14 is an exploded perspective view showing a schematic configuration of a display device including the light source device according to the preferred embodiment of the present invention.
Figure 15:
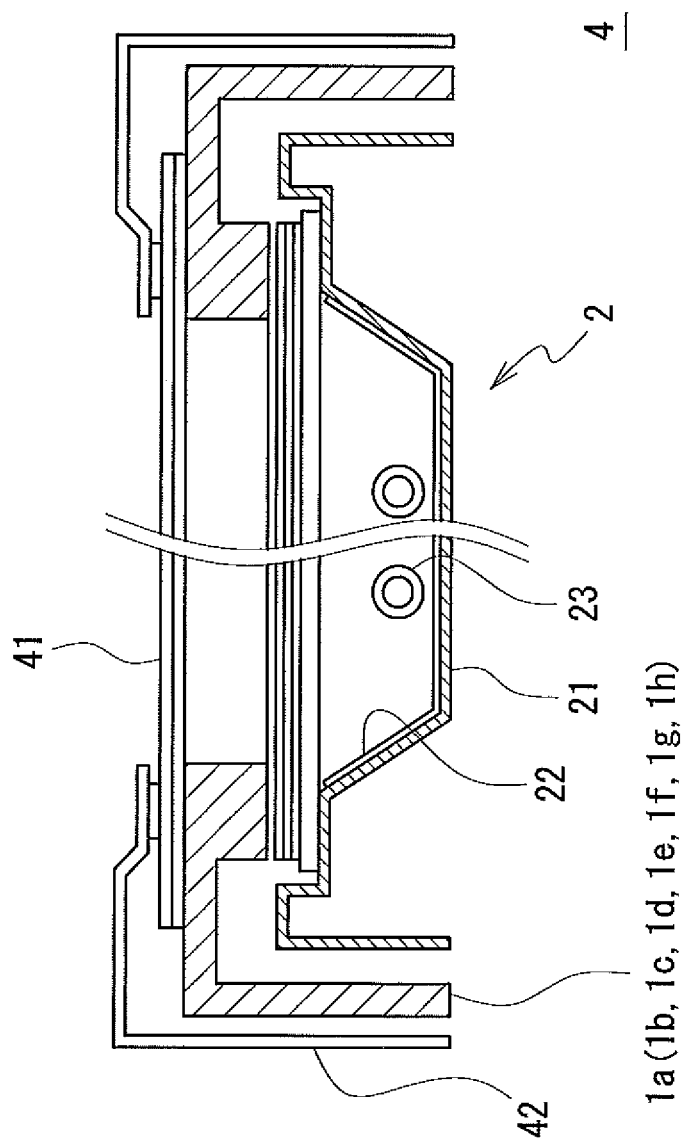
FIG. 15 is a schematic view showing a cross section structure of the display device including the light source device according to the preferred embodiment of the present invention.

Next, a description of a display device 4 that includes the light source device 2 according to the preferred embodiment of the present invention (hereinafter, referred to as a display device 4 according to a preferred embodiment of the present invention) will be provided. FIG. 14 is an exploded perspective view showing a schematic configuration of the display device 4 according to the preferred embodiment of the present invention. FIG. 15 is a schematic view showing a cross section structure of the display device 4 according to the preferred embodiment of the present invention.

As shown in FIGS. 14 and 15, the display device 4 according to the preferred embodiment of the present invention includes the light source device 2 according to the preferred embodiment of the present invention, a display panel assembly 41, a bezel 42, a control circuit board 43, and a control circuit board cover 44.

The display panel assembly 41 includes a display panel, and a circuit board that is attached to the display panel and incorporates driver ICs (or driver SIs) arranged to drive the display panel. A variety of conventional transmissive display panels can be used for the display panel. For example, a generally-used transmissive active matrix liquid crystal display panel can be used.

The bezel 42 has the function of supporting and/or protecting the display panel assembly 41. As shown in FIG. 14, the bezel 42 has a substantially square shape with an opening.

The control circuit board 43 incorporates electronic circuits and/or electric circuits for generating a control signal to drive the display panel based on a signal inputted from the outside (e.g., a tuner). The control circuit board cover 44 has the shape of a plate, or a tray of low height to cover the control circuit board 43. The control circuit board cover 44 has the function of protecting the control circuit board 43, and preventing unnecessary radiation from the control circuit board 43.

Next, a description of assembly of the display device 4 according to the preferred embodiment of the present invention will be provided. The display panel assembly 41 is disposed in front of the light source device 2 according to the preferred embodiment of the present invention. To be specific, a border portion of the display panel of the display panel assembly 41 is placed on the frame 1a, 1b, 1c, 1d, 1e, 1f, 1g or 1h of the light source device 2 according to the preferred embodiment of the present invention. The circuit board attached to the display panel is disposed in front of the front side section 12 outside the outer walls 11.

Then, the bezel 42 is attached to the front side of the light source device 2, and the border portion of the display panel is sandwiched between the front side section 12 of the frame 1a, 1b, 1c, 1d, 1e, 1f, 1g or 1h and the bezel 42, whereby the display panel is held in the display device 4.

As shown in FIG. 15, when the display device 4 is seen from the front side, inner peripheral edges of all the sides of the bezel 42 almost coincide with or slightly inside the inner peripheral surfaces 14a, 14b, 14c, 14d, 14e, 14f, 14g or 14h of the front side section 12 of the frame 1a, 1b, 1c, 1d, 1e, 1f, 1g or 1h. The bezel 42 is formed so as to satisfy the positional relation described above.

The control circuit board 43 is disposed behind the chassis 21 of the light source device 2 according to the preferred embodiment of the present invention. The control circuit board cover 44 is disposed so as to cover the control circuit board 43. In FIG. 15, the control circuit board 43 and the control circuit board cover 44 are omitted and not shown.

In the display device 4 having the configuration described above, the spacer sections 13 of the frame 1a, 1b, 1c, 1d, 1e, 1f, 1g or 1h are interposed between the border portion of the optical members 26 and the border portion of the display panel, whereby the optical members 26 and the display panel are kept apart from each other. The distance between the optical members 26 and the display panel is determined by the height of the spacer sections 13. The height of the spacer sections 13 is not limited specifically, and it is essential only that the height should be set such that the distance is maintained between the optical members 26 and the display panel such that they do not get in contact with each other. The height of the spacer sections 13 is preferably set according to a deformation tendency of the optical members 26.

As described above, being kept apart from each other by the spacer sections 13, the optical members 26 and the display panel do not get in contact with each other and thus get no scratch on their surfaces. Therefore, luminance unevenness resulting from scratches on their surfaces can be prevented from showing up, which can improve the display quality of the display device 4.

When the display device 4 having this configuration is seen from the front side, the inner peripheral surfaces 14a, 14b, 14c, 14d, 14e, 14f, 14g or 14h of the front side section 12 of the frame 1a, 1b, 1c, 1d, 1e, 1f, 1g or 1h can be seen at the border portion of the display panel. The border portion of the optical members 26 (i.e., the portion placed on the support faces 214 of the chassis 21 and the front sides of the side holders 25) is hidden from view behind the spacer sections 13 or the inner walls 18c, 18d, 18g or 18h. The inner peripheral surfaces 14a, 14b, 14c, 14d, 14e, 14f, 14g or 14h of the front side section 12 of the frame 1a, 1b, 1c, 1d, 1e, 1f, 1g or 1h have the substantially white color or the reflection members 17 affixed thereto have the substantially white color, which allows excellent reflection of the light emitted from the light sources 23. Consequently, even if there is clearance between the optical members 26 and the display panel, and the inner peripheral surfaces 14a, 14b, 14c, 14d, 14e, 14f, 14g or 14h of the frame 1a, 1b, 1c, 1d, 1e, 1f, 1g or 1h are seen through the display panel, luminosity at the portion of the display panel on which the inner peripheral surfaces 14a, 14b, 14c, 14d, 14e, 14f, 14g or 14h of the frame 1a, 1b, 1c, 1d, 1e, 1f, 1g or 1h are seen is prevented from being lowered. Therefore, a darker portion does not generate in the border portion of the display panel, whereby image display with even luminosity can be performed all over the display panel.

In particular, the light reflected on the inner peripheral surfaces 14b, 14d, 14f or 14h of the frame 1b, 1d, 1f or 1h that are inclined such that the opening expands from the back side toward the front side easily directs toward the front side of the display device 4. Accordingly, luminosity at the portion of the display panel on which the inner peripheral surfaces 14a, 14b, 14c, 14d, 14e, 14f, 14g or 14h of the frame 1a, 1b, 1c, 1d, 1e, 1f, 1g or 1h are seen is more effectively prevented from being lowered.

In addition, the border portion of the optical members 26 (i.e., the portion placed on the support faces 214 of the chassis 21 and the front sides of the side holders 25) is hidden by the inner peripheral surfaces 14a, 14b, 14c, 14d, 14e, 14f, 14g or 14h of the frame 1a, 1b, 1c, 1d, 1e, 1f, 1g or 1h. Consequently, even if disposed so as to oppose the spacer sections 13 of the frame 1a, 1b, 1c, 1d, 1e, 1f, 1g or 1h, the border portion of the optical members 26 cannot be seen through the display panel. In other words, even if the support faces 214 of the chassis 21 lie opposing the inner peripheral edges of all the sides of the front side section 12, the support faces 214 of the chassis 21 (i.e., the border portion of the optical members 26 placed on the support faces 214) are not seen.

As described above, without disposing the border portion of the optical members 26 so as to coincide far outside the inner peripheral surfaces 14a, 14b, 14c, 14d, 14e, 14f, 14g or 14h of the frame 1a, 1b, 1c, 1d, 1e, 1f, 1g or 1h, the configuration that the border portion of the optical members 26 is not be seen through the display panel can be achieved. Therefore, a frame region of the display device 4 (i.e., the bezel 42) need not be increased in size and thus is prevented from being increased in size, so that an attempt to have a narrower frame region of the display device 4 can be achieved.

In addition, because the frame 1a, 1b, 1c, 1d, 1e, 1f, 1g or 1h has the configuration that the support faces 214 of the chassis 21 are disposed close to the inner peripheral surfaces 14a, 14b, 14c, 14d, 14e, 14f, 14g or 14h of the frame 1a, 1b, 1c, 1d, 1e, 1f, 1g or 1h, the support faces 214 and the top end faces 215 of the chassis 21 need not be decreased in width and thus the support faces 214 and the top end faces 215 can have enough widths, preventing the strength of the chassis 21 from being weakened.

Thus, according to the preferred embodiments of the present invention, while the optical members 26 and the display panel are kept apart from each other and thus prevented from getting a scratch on their surfaces, a darker portion can be prevented from generating in the border portion of the display panel, which can improve the display quality of the display device. In addition, while maintaining the distance between the optical members 26 and the display panel so as not to bring them into contact, the frame region of the display device 4 can be prevented from being increased in size. In addition, while the strength of the chassis 21 is not weakened, a darker portion can be prevented from generating in the border portion of the image displayed on the display panel.

Figure 16:
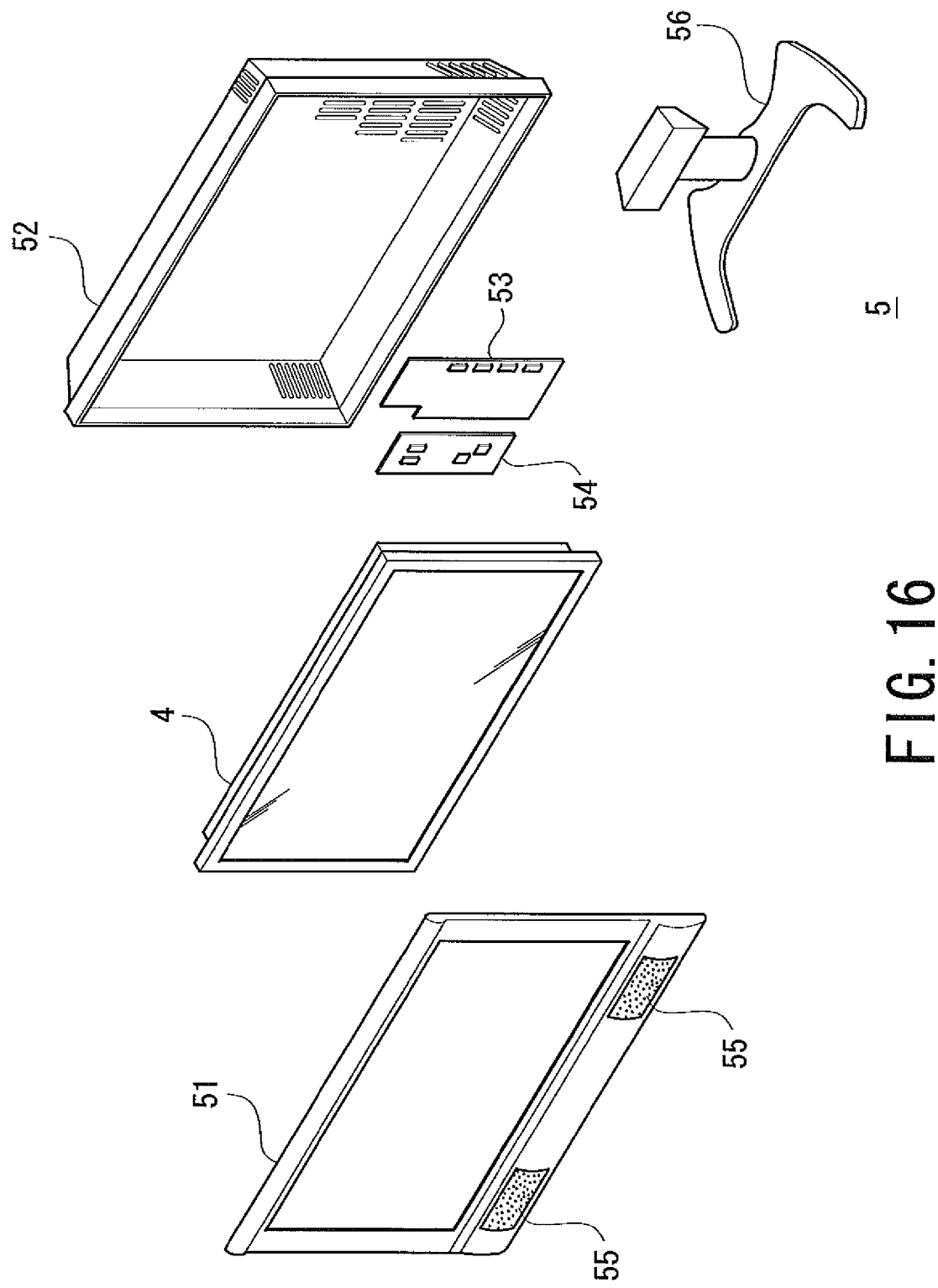
FIG. 16 is an exploded perspective view showing a schematic configuration of a television receiver including the display device according to the preferred embodiment of the present invention.

Next, a brief description of a television receiver 5 including the display device 4 according to the preferred embodiment of the present invention will be provided. FIG. 16 is an exploded perspective view showing a schematic configuration of the television receiver 5 including the display device 4 according to the preferred embodiment of the present invention. The television receiver 5 includes the display device 4 according to the preferred embodiment of the present invention, an electric power supply board 53, a tuner board 54, loudspeaker units 55, a front side cabinet 51, a back side cabinet 52, and a supporting member 56.

The electric power supply board 53 defines a circuit board arranged to supply electric power to the display device 4 according to the preferred embodiment of the present invention, the tuner board 54 and other components.

The tuner board 54 defines a circuit board incorporating a tuner circuit arranged to produce an image signal and a sound signal of a given channel based on a received radio wave and a signal inputted from the outside. A conventional terrestrial tuner circuit (analog, digital, or both), a BS tuner circuit and a CS tuner circuit may be used for the tuner circuit.

The display device 4 according to the preferred embodiment of the present invention is arranged to display an image based on the image signal of the given channel produced by the tuner circuit. The loudspeaker units 55 are arranged to produce a sound based on the sound signal produced by the tuner circuit. A variety of conventional loudspeaker units such as generally-used speakers may be used for the loudspeaker units 55.

The display device 4 according to the preferred embodiment of the present invention, the electric power supply board 53, the tuner board 54 and the loudspeaker units 55 are housed between the front side cabinet 51 and the back side cabinet 52, which is supported by the supporting member 56. The television receiver 5 is not limited to this configuration. For example, the electric power supply board 53, the tuner board 54 and the loudspeaker units 55 may be incorporated in the display device 4 according to the preferred embodiment of the present invention.

The foregoing descriptions of the preferred embodiments of the present invention have been presented for purposes of illustration and description with reference to the drawings. However, it is not intended to limit the present invention to the preferred embodiments, and modifications and variations are possible as long as they do not deviate from the principles of the present invention.

The invention claimed is:

1. A frame for a light source device, on which a display panel is to be placed, the frame comprising:
   a front side section having a substantially square shape, the front side section comprising:
      an opening;
      a surface on which the display panel is to be placed; and
      an inner peripheral surface around the opening, and
   a spacer section having a convex shape that comprises lateral sides and is disposed along an inner peripheral edge of the front side section around the opening on a surface opposite to the surface on which the display panel is to be placed,
   wherein one of the lateral sides of the spacer section comprises the inner peripheral surface of the front side section, wherein the inner peripheral surface has a substantially white color.

2. The frame according to claim 1, wherein the inner peripheral surface of the front side section comprises:
   a surface that is substantially perpendicular to the surface on which the display panel is to be placed; or
   a surface that is inclined such that the opening expands toward the surface on which the display panel is to be placed.

3. The frame according to claim 1, wherein a material from which the frame is made comprises a resin having a substantially white color.

4. The frame according to claim 1, wherein the inner peripheral surface of the front side section comprises paint applied thereto, the paint having a substantially white color.

5. The frame according to claim 1, wherein the inner peripheral surface of the front side section comprises a reflection member affixed thereto that has a substantially white color and is arranged to reflect light.

6. A light source device comprising:
   the frame according to claim 1;
   a light source;
   optical members having at least one of a plate shape and sheet shape that are arranged to control properties of light transmitted therethrough; and
   a chassis having a substantially flat plate shape that comprises a support face on which a border portion of the optical members is placed, the light source being disposed in front of the chassis, the optical members being disposed in front of the chassis, the frame being attached to a front side of the chassis,
   wherein the border portion of the optical members is held between the support face of the chassis and the spacer section of the front side section of the frame while the inner peripheral surface of the front side section is disposed surrounding a region inside the border portion of the optical members that is placed on the support face of the chassis.

7. A display device comprising:
   the light source device according to claim 6;
   a display panel that is arranged to display an image, and disposed on the surface of the front side section of the frame of the light source device on which the display panel is to be placed; and
   a bezel having a substantially square shape that comprises an opening, and is attached to a front side of the display panel and the frame,
   wherein the spacer section of the frame is interposed between a border portion of the display panel and the border portion of the optical members that is placed on the support face of the chassis, whereby the display panel and the optical members are kept apart from each other.

8. A frame for a light source device, on which a display panel is to be placed, the frame comprising:
   a front side section having a substantially square shape, the front side section comprising:
      an opening;
      a surface on which the display panel is to be placed; and
      an inner peripheral surface around the opening, an inner wall that comprises lateral sides; and
   a spacer section having a convex shape that is disposed outside the inner wall, the inner wall and the spacer section being disposed along an inner peripheral edge of the front side section around the opening on a surface opposite to the surface on which the display panel is to be placed,
   wherein one of the lateral sides of the inner wall comprises the inner peripheral surface of the front side section, wherein the inner peripheral surface has a substantially white color.

9. A light source device comprising:
   a frame on which a display panel is to be placed, the frame comprising:
      a front side section having a substantially square shape, the front side section comprising:
         an opening;
         a surface on which the display panel is to be placed; and
         an inner peripheral surface that has a substantially white color and is disposed around the opening;
   a light source;
   optical members having at least one of a plate shape and sheet shape that are arranged to control properties of light transmitted therethrough; and
   a chassis having a substantially flat plate shape that comprises a support face on which a border portion of the optical members is placed, the light source being disposed in front of the chassis, the optical members being disposed in front of the chassis, the frame being attached to a front side of the chassis,
   wherein the border portion of the optical members is held between the support face of the chassis and the front side section of the frame while the inner peripheral surface of the front side section is disposed surrounding a region inside the border portion of the optical members that is placed on the support face of the chassis.

10. A display device comprising:

the light source device according to claim 9;

a display panel that is arranged to display an image, and disposed on the surface of the front side section of the frame of the light source device on which the display panel is to be placed; and a bezel having a substantially square shape that comprises an opening, and is attached to a front side of the display panel and the frame, wherein the front side section of the frame is interposed between a border portion of the display panel and the border portion of the optical members that is placed on the support face of the chassis.

* * * * *